(12) United States Patent
Uenishi et al.

(10) Patent No.: US 6,252,034 B1
(45) Date of Patent: Jun. 26, 2001

(54) PROCESS FOR PRODUCING A POLYCARBONATE RESIN

(75) Inventors: Kazuhiro Uenishi; Masashi Shimonaru; Toru Sawaki; Katsushi Sasaki, all of Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/324,053

(22) Filed: Jun. 2, 1999

(30) Foreign Application Priority Data

| Jun. 4, 1998 | (JP) | 10-155883 |
| Jun. 15, 1998 | (JP) | 10-166998 |
| Jul. 9, 1998 | (JP) | 10-194533 |
| Aug. 24, 1998 | (JP) | 10-237363 |
| Aug. 27, 1998 | (JP) | 10-241612 |
| Sep. 17, 1998 | (JP) | 10-263407 |

(51) Int. Cl.$^7$ ................................................. C08G 64/00
(52) U.S. Cl. ........................................ 528/196; 528/198
(58) Field of Search ................................. 528/196, 198

(56) References Cited

U.S. PATENT DOCUMENTS 5,516,878   5/1996   Sasaki et al. ................. 528/199

FOREIGN PATENT DOCUMENTS 7-268091   10/1995   (JP) .

Primary Examiner—Terressa M. Boykin
(74) Attorney, Agent, or Firm—Sughrue, Mion, Zinn, Macpeak & Seas, PLLC

(57) ABSTRACT

A process for producing a polycarbonate resin through the melt polycondensation of an aromatic diol compound and a carbonic acid diester compound, wherein (1) valves, (2) gear pumps, (3) flanges and (4) flow passages having the specified structures and characteristic properties are used in the production process.

According to the present invention, a high-quality polycarbonate can be obtained by an industrial process.

31 Claims, 10 Drawing Sheets

PROCESS FOR PRODUCING A POLYCARBONATE RESIN

DETAILED DESCRIPTION OF THE INVENTION

1. Field of the Invention

The present invention relates to a process for producing a polycarbonate resin and, specifically, to a process for producing a polycarbonate resin through a melt polycondensation reaction between an aromatic diol compound and a carbonic acid diester. More specifically, the present invention relates to improvements on a valve, gear pump, flange or flow passage for the transfer of a reaction mixture among a plurality of polymerization reactors in an industrial process for producing a polycarbonate resin through a melt polycondensation reaction. The improvements in the present invention are applied to the discharge of a polycarbonate resin from a final polymerization reactor and the transfer of the polycarbonate resin to the following step.

2. Prior Art

An aromatic polycarbonate resin is widely used as a molding material because it is excellent in mechanical properties such as impact resistance as well as heat resistance and transparency. Known processes for producing such an aromatic polycarbonate resin include one (interfacial process) in which an aromatic diol compound such as bisphenol and phosgene are directly reacted with each other and one (melting process) in which an aromatic diol compound such as bisphenol and an aromatic carbonic acid diester such as diphenyl carbonate are subjected to an ester exchange reaction.

Out of these production processes, the process for producing a polycarbonate through an ester exchange reaction between an aromatic diol compound and an aromatic carbonic acid diester is generally carried out by distilling off from a reaction mixture a monohydroxy compound such as a phenol by-produced by gradually elevating the reaction temperature from 150° C. which is the lowest temperature required to start an ester exchange reaction to about 350° C. in the presence of an organic acid salt, inorganic acid salt, oxide, hydroxide, hydride or alcoholate of a metal as a catalyst and gradually reducing the pressure from atmospheric pressure to $13.3 \times 10^{-6}$ MPa.

In the step of transferring the reaction mixture between polymerization reactors and the step of discharging the reaction mixture from the final polymerization reactor, valves, pumps, flanges and flow passages (pipes) are used. These transfer members are used at a high temperature and a high degree of vacuum. Since the viscosity of the reaction mixture rises to an extremely high level, generally 200 to 10,000 Pa·S (2,000 to 100,000 poise), which differs according to reaction conditions, along with the proceeding of the reaction (reaching completion), the pressure of the pump must be increased in accordance with resistance (pressure loss) generated in the pipe (flow passage) to transfer the reaction mixture through the pipe, and these transfer members must stand high pressure.

The term "reaction mixture" as used herein means a mixture obtained after a polycondensation reaction starts, proceeds or ends in the step of obtaining an aromatic polycarbonate by carrying out the melt polycondensation reaction of a mixture containing an aromatic diol compound and an aromatic carbonic acid diester as essential ingredients in the presence of an ester exchange catalyst. A reaction mixture whose polymerization degree proceeds to some extent is generally called "prepolymer" according to chemical terminology and a reaction mixture whose polymerization degree proceeds further is called "polymer" according to chemical terminology.

BRIEF DESCRIPTION OF THE DRAWINGS

Explanations of Notations in FIG. 1 and FIG. 2
(1) valve
(2) gear pump
(3) flange
(4) flow passage
I to IV: Polymerization Reactor
A: vertical polymerization reactor
B: horizontal polymerization reactor

Explanations of Notations in FIG. 3 to FIG. 9
1 ball
2 inner space of ball
3 portion opposite to ball 1
4 clearance
5 sheet packing
11 plug
12 inner space
13 valve body
14 space
31 stem
32 disk
33 residence space
34 seat
41 stem
42 disk
43 seat
44 handle
45 space
51 valve body
52 heating medium jacket
53 tubular portion
54 inlet port of reaction mixture
55 outlet port of reaction mixture
56 stem
57 gland packing
58 handle
59 portion on a downstream side of spacer 62
60 seat
61 O ring 62 spacer
63 space
a flow direction of fluid
b moving direction of plug
c flow direction of fluid
d flow direction of fluid
e flow direction of fluid

Explanations of Notations in FIG. 10 to FIG. 13
101 front plate
102 gear case
103 back plate
104 bushing
105 heating medium jacket
106 driving shaft
107 follow shaft
108 gear
109 gear
110 inlet port of reaction mixture
111 outlet port of reaction mixture
112 driving shaft seal
113 O ring
114 scraper
115 bushing fixing bolt
116 O ring
117 lubricating groove
118 exhaust groove
119 sliding surfaces of gears 108 and 109
120 contact surfaces between bushing 104 and front plate 101 and between bushing 104 and back plate 103
121 inlet port of reaction mixture for lubrication

Explanations of Notations in FIG. 14 to FIG. 15
201 flange (female)
202 flange (male)
203 heating medium jacket
204 pipe welded portion
205 metal-to-metal sealing surface
206 metal O ring attachment portion
207 groove portion (male)
208 groove portion (female)
209 bolt/nut attachment hole

Figure 16:
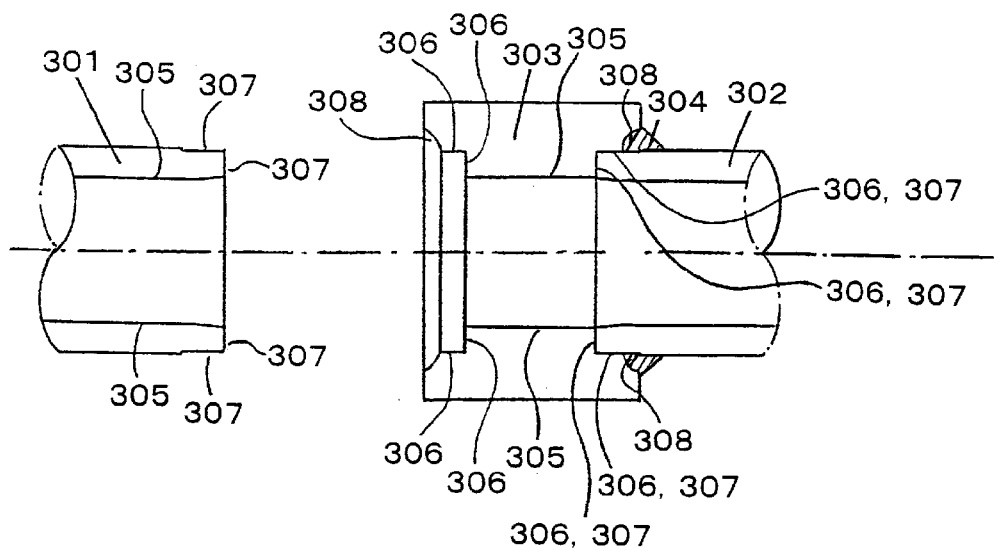
FIG. 16 is a sectional view of an example of a socket according to the present invention.

Explanations of Notations in FIG. 16
301 pipe
302 pipe
303 socket
304 welding
305 liquid contact portion
306 surfaces in contact with socket 303 of pipes 301 and 302
307 surfaces in contact with pipes 301 and 302 of socket 303

Figure 21:
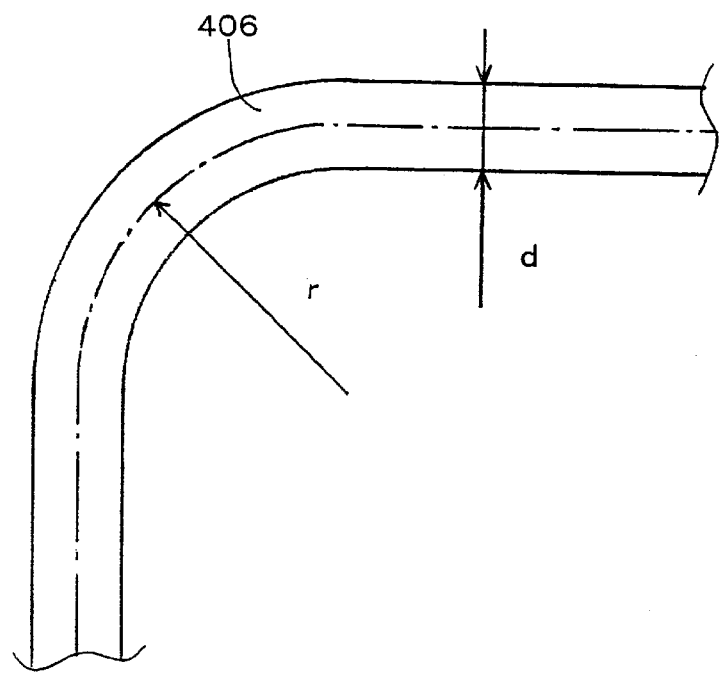
Figure 19:
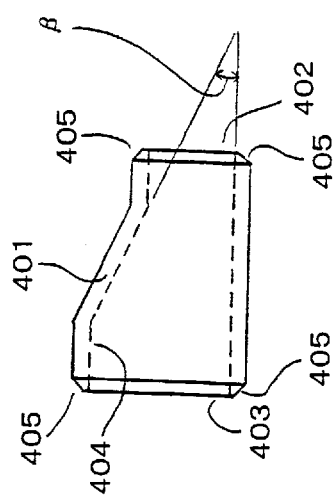
Figure 20:
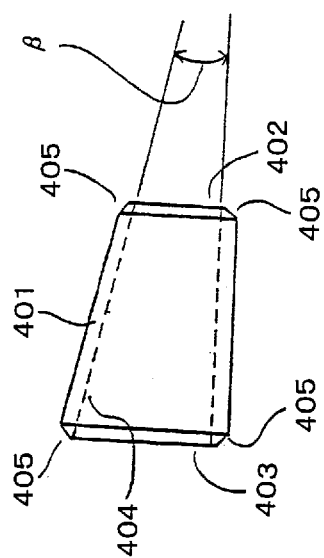
Figure 17:
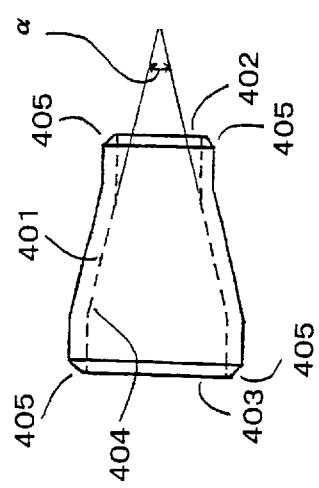
Figure 18:
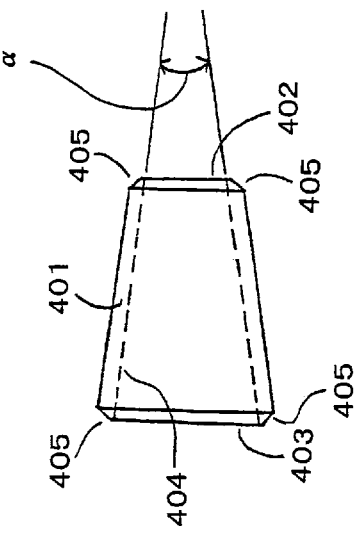

FIG. 17 shows an example of a reducer (concentric type) in a flow passage according to the present invention;

FIG. 18 shows an example of a reducer (concentric type) in a flow passage according to the present invention;

FIG. 19 shows an example of a reducer (eccentric type) in a flow passage according to the present invention;

FIG. 20 shows an example of a reducer (eccentric type) in a flow passage according to the present invention; and FIG. 21 shows an example of a curved pipe portion in a flow passage according to the present invention.

Explanations of Notations in FIG. 17 to FIG. 21
401 reducer body
402 small pipe side
403 large pipe side
404 liquid contact portion
405 welded portion
406 curved portion It is an object of the present invention to improve (1) valves, (2) pumps, (3) flanges and (4) flow passages (may be referred to as "transfer members" hereinafter) used to transfer a reaction mixture when a polycarbonate resin (to be simply referred to as "polycarbonate" hereinafter) is produced by an industrial process. Particularly, it is an object of the present invention to make improvements to obtain a high-quality polycarbonate by suppressing as much as possible a deteriorated product formed by the residence of a reaction mixture in the transfer members.

According to studies conducted by the inventors of the present invention, it has been found that the above objects of the present invention are attained by using (1) valves, (2) pumps, (3) flanges and (4) flow passages having the following structures and characteristic properties.

That is, according to the present invention, there is provided a process for producing a polycarbonate resin through the melt polycondensation of an aromatic diol compound and a carbonic acid diester compound, wherein (1) valves, (2) pumps, (3) flanges and (4) flow passages having the following structures and characteristic properties are used in the production process.

(1) valve; Y-shaped globe valve which has a heat durability of 150° C. or more, substantially no leakage under a vacuum pressure of $40,000 \times 10^{-6}$ MPa or less and a pressure durability of 0.1 MPa or more, and whose liquid contact portion is made from a material having corrosion resistance against a monohydroxy compound formed by a reaction between the aromatic diol compound and the carbonic acid diester compound (2) gear pump; gear pump which has a heat durability of 150° C. or more, substantially no leakage under a vacuum pressure of $40,000 \times 10^{-6}$ MPa, a pressure durability of 0.1 MPa or more and a delivery pressure of 1 MPa or more, whose liquid contact portion is made from a material having corrosion resistance against a monohydroxy compound formed by a reaction between the aromatic diol compound and the carbonic acid diester compound, and which has such a structure that the reaction mixture under a vacuum pressure of $40,000 \times 10^{-6}$ MPa or less can be discharged and that the reaction mixture for lubricating contact portions among a gear, shaft and other gear pump members does not return into the pump and is discharged to the outside of the pump.

(3) flange; flange which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, and which has a heating medium jacket therein.

(4) flow passage; flow passage which has a heat durability of 150° C. or more, substantially no leakage under a vacuum pressure of 40,000×10⁻⁶ MPa or less and a pressure durability of 0.1 MPa or more, whose liquid contact portion is made from a material having corrosion resistance against a monohydroxy compound formed by a reaction between the aromatic diol compound and the carbonic acid diester compound, which is restricted and/or expanded at a vertical angle of 20° or less, and whose surface is smooth without level differences.

The polycarbonate production process of the present invention will be described in detail hereinafter.

Figure 1:
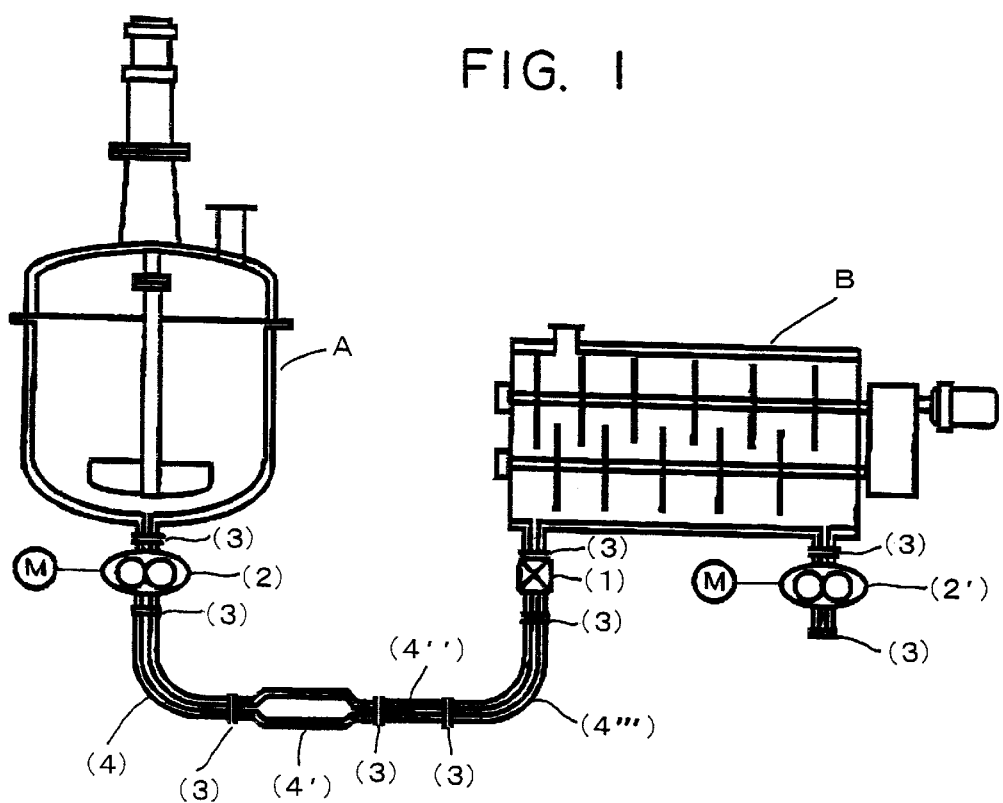
FIG. 1 is a diagram of a process typically showing an example of the arrangement of valves, pumps, flanges and flow passages for the production of the polycarbonate resin of the present invention.

In the present invention, the transfer members are used to transfer a reaction mixture between polymerization reactors or to discharge the reaction mixture from a final polymerization reactor in the production of a polycarbonate through melt polycondensation. The transfer members will be described with reference to FIG. 1 and FIG. 2. FIG. 1 shows an example of the process of the present invention in which a vertical polymerization reactor A and a horizontal polymerization reactor B are used. In FIG. 1, a reaction mixture is discharged quantitatively by a gear pump (2) from the vertical polymerization reactor A, introduced into curved pipes (4') and (4") through a curved pipe, passed through a curved pipe (4) and a valve (1) and introduced into the inlet of the horizontal polymerization reactor B. The reaction mixture is discharged from the outlet of the horizontal polymerization reactor B by a gear pump (2'). Flanges (3) are used in this transfer route.

FIG. 1 is a diagram typically showing an example of the arrangement of the valves (1), gear pumps (2), flanges (3) and flow passages (4) of the present invention. The types of polymerization reactors, the arrangement order of the transfer members and the number of transfer members of each type are not limited to those of FIG. 1.

The transfer members including pipes in FIG. 1 are heated by a heating medium jacket.

Figure 2:
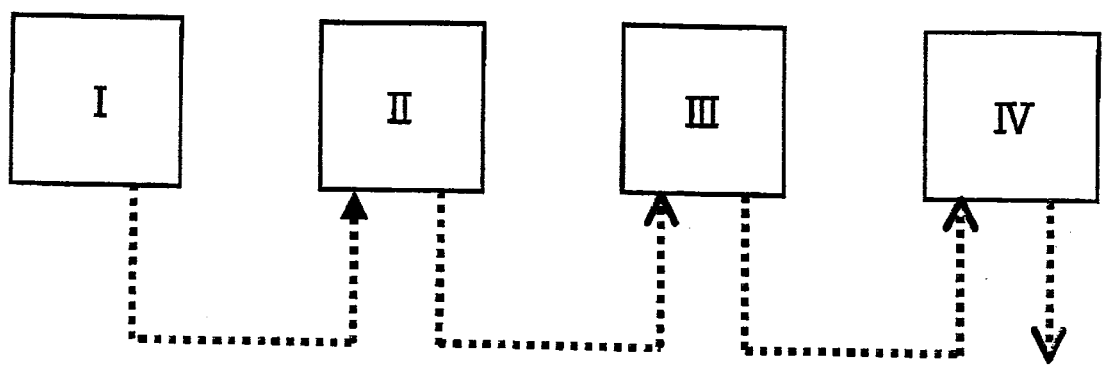
FIG. 2 is diagram typically showing the transfer route of a reaction mixture in which valves, pumps, flanges and flow passages can be arranged in polymerization reactors (I to IV) for the production of the polycarbonate resin of the present invention (portions shown by dotted lines indicate the transfer route)

FIG. 2 shows a flow of the reaction mixture when polymerization reactors I to IV are connected in series. The transfer members of the present invention can be arranged along the route shown by dotted lines in FIG. 2. The polymerization reactors I to IV may be of either a vertical or horizontal type.

FIG. 2 shows four polymerization reactors but the number of polymerization reactors may be 2 to 5 and each of the polymerization reactors is maintained at a predetermined pressure and a predetermined temperature.

The present invention makes it possible to obtain a high-quality polycarbonate which rarely produces a deteriorated product of a polymer and is used as a base material for an optical recording material by using (1) valves, (2) gear pumps, (3) flanges and (4) flow passages having the above structures and characteristic properties as transfer members.

According to another aspect of the present invention, there is provided (a) a process for producing a polycarbonate resin through the melt polycondensation of an aromatic diol compound and a carbonic acid diester compound, wherein (1) valves, (2) gear pumps and (3) flanges used in the production process have the above structures and characteristic properties.

According to still another aspect of the present invention, there is provided (b) a process for producing a polycarbonate resin through the melt polycondensation of an aromatic diol compound and a carbonic acid diester compound, wherein at least two members out of (1) valves, (2) gear pumps and (3) flanges used in the production process have the above structures and characteristic properties.

In this aspect (b), (4) flow passages having the above structure and characteristic properties may be used.

According to a further aspect of the present invention, there is provided (c) a process for producing a polycarbonate resin through the melt polycondensation of an aromatic diol compound and a carbonic acid diester compound, wherein at least one member out of (1) valves, (2) gear pumps and (3) flanges used in the production process has the above structure and characteristic properties.

In the above aspect (c), (4) flow passages having the above structure and characteristic properties may further be used.

According to a still further aspect of the present invention, there is provided (d) a process for producing a polycarbonate resin through the melt polycondensation of an aromatic diol compound and a carbonic acid diester compound, wherein at least one member out of (1) valves, (2) gear pumps, (3) flanges and (4) flow passages used in the production process has the above structure and characteristic properties.

In this aspect (d), it is preferred that at least two out of the above transfer members used in the production process have the above structures and characteristic properties.

The polycarbonate in the present invention will be described in detail hereinafter.

The term "aromatic polycarbonate" as used herein means an aromatic polycarbonate obtained by the melt polycondensation of an aromatic diol compound and a carbonic acid diester as essential ingredients in the presence of an ester exchange catalyst such as one comprising an alkali earth metal compound, an alkali metal compound or a nitrogen-containing basic compound.

Illustrative examples of the aromatic diol compound include bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, 1,1-bis(4-hydroxyphenyl)-3,3,5-trimethylcyclohexane, 4,4-(m-phenylenediisopropylidene)diphenol, bis(4-hydroxyphenyl)oxide, bis(3,5-dichloro-4-hydroxyphenyl)oxide, p,p'-dihydroxydiphenyl, 3,3'-dichloro-4,4'-dihydroxydiphenyl, bis(hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide, bis(4-hydroxyphenyl)sulfoxide and the like. Out of these, 2,2-bis(4-hydroxyphenyl)propane is particularly preferred.

Illustrative examples of the carbonic acid diester include diphenyl carbonate, ditolyl carbonate, bis (chlorophenyl) carbonate, m-cresyl carbonate, dinaphthyl carbonate, bis (diphenyl)carbonate, dimethyl carbonate, diethyl carbonate, dibutyl carbonate, dicyclohexyl carbonate and the like. Out of these, diphenyl carbonate is particularly preferred.

Further, the polycarbonate of the present invention may further contain an aliphatic diol such as ethylene glycol, 1,4-butanediol, 1,4-cyclohexane dimethanol or 1,10-decanediol; a dicarboxylic acid such as succinic acid, isophthalic acid, 2,6-naphthalenedicarboxylic acid, adipic acid, cyclohexanecarboxylic acid or terephthalic acid; or an oxyacid such as lactic acid, p-hydroxybenzoic acid or 6-hydroxy-2-naphthoic acid as required.

The alkali metal compound used as a catalyst is, for example, a hydroxide, bicarbonate, carbonate, acetate, nitrate, nitrite, sulfite, cyanate, thiocyanate, stearate, borohydride, benzoate, hydrogen phosphate, bisphenol salt or phenol salt of an alkali metal.

Illustrative examples of the alkali metal compound include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenyl borate, potassium phenyl borate, lithium phenyl borate, sodium benzoate, potassium benzoate, lithium benzoate, disodium hydrogen phosphate, dipotassium hydrogen phosphate, dilithium hydrogen phosphate, disodium salts, dipotassium salts and dilithium salts of bisphenol A, and sodium salts, potassium salts and lithium salts of phenol.

The alkali earth metal compound used as a catalyst is a hydroxide, acetate, nitrate, nitrite, sulfite, cyanate, thiocyanate, stearate, benzoate, hydrogenphosphate, bisphenol salt or phenol salt of an alkali earth metal.

Illustrative examples of the alkali earth metal compound include barium hydroxide, calcium hydroxide, strontium hydroxide, magnesium hydroxide, barium acetate, calcium acetate, strontium acetate, magnesium acetate, barium nitrate, calcium nitrate, strontium nitrate, magnesium nitrate, calcium salts, barium salts, strontium salts and magnesium salts of bisphenol A, calcium salts, barium salts, strontium salts and magnesium salts of phenol, and the like.

The alkali metal compound or alkali earth metal compound as a catalyst is preferably used in such a proportion that the amount of an elemental alkali metal or alkali earth metal contained in the catalyst should be $1 \times 10^{-8}$ to $5 \times 10^{-5}$ equivalent, preferably $5 \times 10^{-7}$ to $1 \times 10^{-5}$ equivalent based on 1 mol of the aromatic diol compound.

Illustrative examples of the nitrogen-containing basic compound as a catalyst include ammonium hydroxides having an alkyl, aryl or alkylaryl group such as tetramethyl ammonium hydroxide ($Me_4NOH$), tetraethyl ammonium hydroxide ($Et_4NOH$), tetrabutyl ammonium hydroxide ($Bu_4NOH$), benzyltrimethyl ammonium hydroxide ($\Phi$-$CH_2$($Me$)$_3NOH$) and hexadecyltrimethyl ammonium hydroxide; tertiary amines such as triethylamine, tributylamine, dimethylbenzylamine and hexadecyldimethylamine; and basic salts such as tetramethyl ammonium borohydride ($Me_4NBH_4$), tetrabutyl ammonium borohydride ($Bu_4NBH_4$), tetrabutyl ammonium tetraphenyl borate ($Me_4NBPh_4$) and tetrabutyl ammonium tetraphenyl borate ($Bu_4NBPh_4$).

The above nitrogen-containing basic compound is preferably used in such a proportion that the amount of ammonium nitrogen atoms contained in the nitrogen-containing basic compound should be $1 \times 10^{-5}$ to $5 \times 10^{-4}$ equivalent, more preferably $2 \times 10^{-5}$ to $5 \times 10^{-4}$ equivalent, particularly preferably $5 \times 10^{-5}$ to $5 \times 10^{-4}$ equivalent based on 1 mol of the aromatic diol compound.

In the present invention, (a) an alkali metal salt of a complex of the group 14 element of the periodic table or (b) an alkali metal salt of an oxoacid of the group 14 element of the periodic table as disclosed by JP-A 7-268091 (the term "JP-A" as used herein means an "unexamined published Japanese patent application") may be used as the alkali metal compound catalyst as desired. The group 14 element of the periodic table is silicon, germanium or tin.

The polycondensation reaction can be quickly and fully promoted by using the alkali metal salt of the above mentioned complex of the group 14 element as a polycondensation reaction catalyst. Further, an undesired side-reaction such as a branching reaction generated during the polycondensation reaction can be suppressed to a low level by using the above catalyst.

The above polycondensation reaction catalyst is preferably used in such a proportion that the amount of an elemental alkali metal contained in the catalyst should be $1 \times 10^{-8}$ to $5 \times 10^{-5}$ equivalent, more preferably $5 \times 10^{-7}$ to $1 \times 10^{-5}$ equivalent based on 1 mol of the aromatic diol compound.

At least one co-catalyst selected from the group consisting of oxoacids of the group 14 elements of the periodic table and oxides of the elements may be used in conjunction with the above catalyst as required in the polycondensation reaction of the present invention.

A branching reaction which is readily initiated during the polycondensation reaction, the formation of foreign matter in an apparatus during molding and an undesired side-reaction such as a color difference can be effectively suppressed without impeding the capping reaction of a terminal and decreasing a polycondensation reaction speed by using the above co-catalyst in a specific proportion.

The co-catalyst is preferably existent in such a proportion that the amount of the group 14 metal element of the periodic table contained in the co-catalyst should be 0.1 to 30 mols based on 1 mol (atoms) of the elemental alkali metal contained in the polycondensation reaction catalyst.

The above catalytic system has such an advantage that a polycondensation reaction and a terminal capping reaction can be quickly and fully promoted by using these catalysts for the polycondensation reaction. It can also suppress an undesired side-reaction such as a branching reaction in the polycondensation reaction system to a low level.

The temperature and the pressure for carrying out an ester exchange reaction between an aromatic diol compound and a carbonic acid diester compound are not particularly limited in the present invention. Any temperature and any pressure are acceptable if the reaction starts and a monohydroxy compound formed by the reaction is swiftly removed from the reaction system. However, it is the most common that, after the reaction is started at a temperature of 150 to 200° C. and a pressure of $40,000 \times 10^{-6}$ to $13,333 \times 10^{-6}$ MPa, the reaction temperature is elevated and the reaction pressure is reduced as the molecular weight of a polycarbonate grows along with the proceeding of the reaction and the reaction is carried out finally at a temperature of 270 to 350° C. and a pressure of $133 \times 10^{-6}$ MPa or less. More specifically, it is preferred to carry out the reaction at a temperature of 150 to 220° C. and a pressure of $40,000 \times 10^{-6}$ to $13,333 \times 10^{-6}$ MPa when the viscosity average molecular weight (Mv) of a polycarbonate is 1,000 to 2,000, at a temperature of 180 to 240° C. and a pressure of $20,000 \times 10^{-6}$ to $2,000 \times 10^{-6}$ MPa when Mv is 2,000 to 4,000, at a temperature of 200 to 250° C. and a pressure of $13,333 \times 10^{-6}$ to $1,333 \times 10^{-6}$ MPa when Mv is 4,000 to 6,000, at a temperature of 220 to 280° C. and a pressure of $4,000 \times 10^{-6}$ to $133 \times 10^{-6}$ MPa when Mv is 6,000 to 10,000, and at a temperature of 250 to 300° C. and a pressure of $133 \times 10^{-6}$ MPa or less when Mv is more than 10,000. The unit of pressure used is absolute pressure throughout the specification unless otherwise stated.

A stabilizer may be added to the polycarbonate obtained in the present invention. Known stabilizers are effectively used as the stabilizer used in the present invention. Out of these, ammonium salts and phosphonium salts of sulfonic acid are preferred, and the above salts of dodecylbenzenesulfonic acid such as tetrabutylphosphonium dodecylbenzenesulfonate and the above salts of paratoluenesulfonic acids such as tetrabutyl ammonium paratoluenesulfonate are particularly preferred. Preferred sulfonic acid esters include methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate, phenyl paratoluenesulfonate and the like. Out of these, tetrabutyl phosphonium dodecylbenzenesulfonate is the most preferred.

The amount of the stabilizer is 0.5 to 50 mols, preferably 0.5 to 10 mols, more preferably 0.8 to 5 mols based on 1 mol of the polymerization catalyst selected from alkali metal compounds and/or alkali earth metal compounds.

Equipment for carrying out the present invention is not particularly limited and the present invention may be carried out in a batch or continuous system. When the batch system is used, two reactors are generally connected in series, an agitator equipped with a distillator is used for the first reactor, and an agitator without distillator is used for the second reactor to carry out a reaction under different conditions. In this case, it is preferred that both reactors be connected by a pipe equipped with a valve, the reaction mixture of the first reactor be transferred to the second reactor without being exposed to the outside air, and a reaction be carried out to a desired degree of polymerization in the second reactor.

When the continuous system is used, two or more reactors are generally connected in series, adjacent reactors are connected by a pipe equipped with a valve, equipment comprising a pump for transferring a reaction mixture as required is used to supply raw materials and a catalyst to the first reactor continuously while the reactors are maintained under different conditions, and a polycarbonate having a desired degree of polymerization is discharged continuously from the final reactor.

The above equipment must have a function to stop or branch a flow of the reaction mixture and valves installed in vessels and pipes for this purpose play an important role.

Gear pumps, flanges and flow passages for transferring or discharging the reaction mixture must have an important function to obtain a high-quality polycarbonate.

According to studies conducted by the present inventors, it has been found that the polycarbonate is colored, is changed or is varied a deteriorated product called "three-dimensionally crosslinked gel" when it receives long-time heat history though the influence of oxygen is completely eliminated, unlike other polycondensation polymers such as polyethylene terephthalate. This reduces the quality of the obtained polycarbonate and causes a serious problem in optical application.

To solve this problem, it is important to eliminate a residence portion of the reaction mixture in the equipment. Various studies have been made to eliminate the residence portion in the reactor and various proposals have been made. However, the quality of a polycarbonate obtained by melt polymerization is still unsatisfactory in fact.

The expression "residence portion of the reaction mixture" as used herein means a portion of the reaction mixture which deteriorates the quality of a polycarbonate product because a deteriorated product formed at a site where the continuous replacement of the reaction mixture hardly occurs is contained in the reaction mixture. The expression "residence portion" means "residence portion of the reaction mixture" throughout the specification.

As described above, in the present invention, when a polycarbonate is produced by an industrial process, it is an object of the present invention to improve and change each of (1) valves, (2) pumps, (3) flanges and (4) flow passages (they may be referred to as "transfer members") for the transfer of a reaction mixture. The problems of each of the transfer members of the prior art and the improvements of the transfer members made by the present invention will be described in detail hereinafter.

(1) Valve;

In the production of a polycarbonate through a melt polycondensation reaction, a ball valve, plug valve or T-shaped globe valve has been used to stop a flow of a reaction mixture in a straight portion of a pipe.

However, the significance of the influence of the valve upon the quality of a polycarbonate product has not been realized in the prior art and these valves have been selected from the viewpoints of a pressure loss generated in the pipe, pressure durability, vacuum resistance and the economy of equipment investment.

The present inventors have found in the course of studies on the improvement of the quality of a polycarbonate product produced by an ester exchange method that the structure of a valve has a great influence upon the quality of a polycarbonate product and have conducted intensive studies on the structures of various valves.

It seems that the reason why this problem has not been realized in the production of a polycarbonate by an interfacial method is that temperature, pressure and other conditions are much milder than those of the ester exchange method.

The problems of the valve of the prior art which have been found in the course of studies are as follows.

Figure 3:
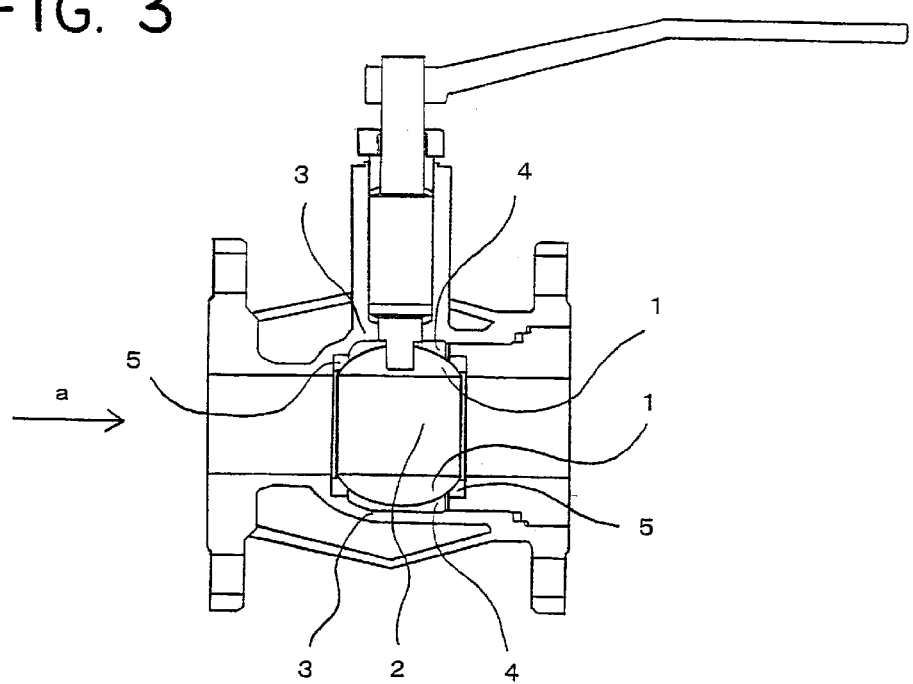
FIG. 3 is a sectional view of an example of a ball valve of the prior art.

(1) Example of Ball Valve (see FIG. 3)

In FIG. 3, a ball valve has such a structure that a passing fluid can flow when the inner space 2 of a ball 1 is opened in a flow direction "a" of the fluid as shown in FIG. 3 and its flow is stopped when the inner space 2 is not opened in the flow direction "a" of the fluid.

It has been found that, in the valve having the above structure, when a flow of a reaction mixture is stopped, the reaction mixture existent in the inner space 2 of the ball is cooped up in the inner space 2 and the cooped and retained reaction mixture is apt to deteriorate and pollute the quality of a polycarbonate product intermittently by opening the ball valve. It has also been found that as a clearance 4 for moving the valve is interposed between the ball 1 and a portion 3 opposite to the ball 1 of the valve body, the reaction mixture enters this clearance, resides in the clearance and deteriorates, making the movement of the valve difficult and generating highly deteriorated foreign matter losing flowability (gel) with the result that a non-negligible quality problem arises in the polycarbonate product. The clearance 4 above and below the ball is shown in FIG. 3 but it also exists around side portions of the ball 1. Since the ball 1 slides over a sheet packing 5 while it contacts it during the operation of the valve, the surface of the seat packing 5 is apt to be chipped and generate powders. Particularly when a heat durability carbon packing is used as the seat packing 5, generated powders have a significant bad influence upon the quality of a product.

Figure 4:
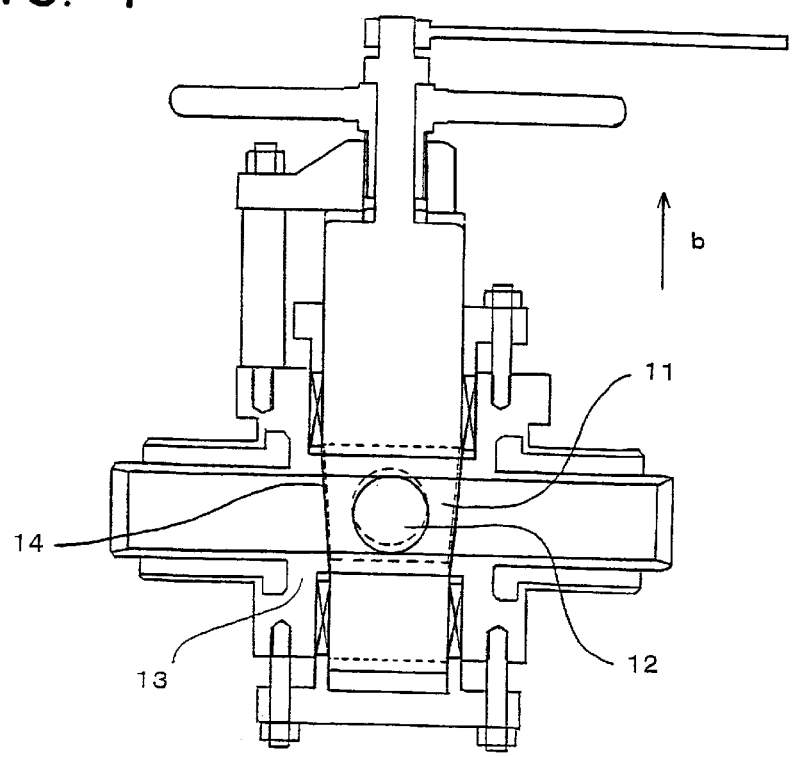
FIG. 4 is a sectional view of an example of a plug valve of the prior art.

(2) Example of Plug Valve (see FIG. 4)

This valve has such a structure as shown in FIG. 4 and is superior to a ball valve because it does not generate packing powders as it is not sealed with a seat packing unlike the above ball valve, its maintenance is easy as it does not use a seat packing having a shorter service life than the valve body and there is no residence portion as there is no clearance between a plug 11 and a valve body 13. However, like the ball valve, as shown in FIG. 4, when the flow of the reaction mixture is stopped, the reaction mixture is cooped in the inner space 12 of the plug 11 and the cooped and retained reaction mixture is liable to deteriorate. Further, to move the valve, the plug 11 must be turned after the plug is lifted to form a clearance (the plug itself is moved in a direction of the handle of the valve, that is, direction "b" in FIG. 4) because metal-to-metal sealing is effected for a gap between the valve body 13 and the plug 11. By this operation, a space 14 which the reaction mixture enters is formed around the side surface of the plug and the reaction mixture residing in this portion is apt to deteriorate. Further, it is difficult to maintain a vacuum atmosphere in the valve when the valve is moved, the reaction mixture is liable to contact air outside the valve and deteriorate by oxidation, and the automation of the operation of lifting this plug is difficult.

The present inventors have conducted studies on the structure and characteristic properties of a valve for improving the above problems of the prior art and efficiently obtaining a polymer which rarely produces a deteriorated product and has excellent quality in an industrial process for producing a polycarbonate. As a result, they have found that a high-quality polycarbonate which rarely produces the deteriorated product of the polymer can be obtained by using the following valve.

That is, according to the present invention, there is provided a process for producing a polycarbonate resin through the melt polycondensation of an aromatic diol compound and a carbonic acid diester compound, wherein (1) valves having the following structure and performance are used in the production process.

(1) valve; Y-shaped globe valve which has substantially no leakage under a vacuum pressure of $40,000 \times 10^{-6}$ MPa or less, and whose liquid contact portion is made from a material having corrosion resistance against a monohydroxy compound formed by a reaction between the aromatic diol compound and the carbonic acid diester compound.

A detailed description is subsequently given of the above valve.

In the valve of the present invention, the expression "substantially no leakage under a vacuum pressure of $40,000 \times 10^{-6}$ MPa or less" means that the leakage of gas from the outside of the valve is $120 \times 10^{-6}$ MPa·l/h or less based on 1 liter of the inner capacity of the valve when the ultimate vacuum degree of the valve is $13.3 \times 10^{-6}$ MPa.

With this method for measuring the leakage of gas, the measurement may not be easy because the inner capacity of the valve is too small. In this case, when a helium leak test is carried out at $0.133 \times 10^{-6}$ MPa, $3 \times 10^{-5}$ ACC/S or less can be used instead. The measurement method is as follows.

a. Gas Leakage Measurement Method

The measurement of the leakage of gas is carried out by sucking gas inside the value by a vacuum pump to reduce the pressure inside the value to $13.3 \times 10^{-6}$ MPa, stopping suction and confirming after one hour that the pressure inside the value is lower than a predetermined pressure. When the capacity of the value is 1 litter, for example, the value stands the test the pressure inside the value is lower than $133 \times 10^{-6}$ MPa one hour after the suction of the vacuum pump is stopped.

b. Helium Leak Test

Gas inside the value is sucked by a vacuum pump to reduce the pressure inside the value to $0.133 \times 10^{-6}$ MPa or less, a helium leak detector is connected to the value and the vacuum pump, the value is covered with a bag while suction by the vacuum pump is continued, helium is blown into the inside of bag from the outside, and the leakage of helium into the inside of the value is measured by the helium leak detector. If the leakage of the detected helium is $3 \times 10^{-5}$ ACC/S or less, the value stands test. The DLMS-TP3E of Nippon Shinku Gijutsu Co., Ltd. may be used as the helium leak detector.

ACC/S means atm·cc/sec which indicates a volume at 1 atm. and normal temperature as the leakage of helium per unit sec.

Thus, the valve is desired to have no leakage because it is the outside air, especially oxygen entering the reactor that deteriorates the reaction mixture and has a significant bad influence upon the quality of a polycarbonate product. Since the valve has a relatively complex structure that it has a movable portion, such air easily enters the valve.

Since the reaction mixture is oxidized as soon as it is exposed to oxygen, it is colored or deteriorated, thereby greatly reducing the quality of the polycarbonate. Therefore, it is important to prevent the reaction mixture from being exposed to oxygen contained in the air and it is desired to improve air tightness and place the gland portion of the valve in 98 vol % or more of nitrogen atmosphere.

In the valve of the present invention, the expression "liquid contact portion is made from a material having corrosion resistance against a monohydroxy compound formed by a reaction between the aromatic diol compound and the carbonic acid diester compound" means that any material is acceptable as the material of the liquid contact portion if it does not impair the function of the valve and does not substantially dissolve into the product during the use of the valve. A seat portion of the valve is preferably made from stellite such as STELLITE FACE#6 and the valve body is preferably made from stainless steel such as SUS304, SUS304L, SUS316, SUS316L, SUS630, SCS13, SCS14, SCS16 or SCS19, specified by JIS.

Any material is acceptable as the material of the gland packing if it has required sealing properties. For example, a coil packing prepared by knitting asbestos, carbon fibers, polytetrafluoroethylene (PTFE) fibers, aramide fibers or expanded graphite yarn into a predetermined shape with a rectangular cross section or the like and impregnating with PTFE, graphite or lubricating oil and/or a packing molded into a ring form with a V-shaped cross section are/is preferably used.

Any material is acceptable as the material of a gasket if it has required sealing properties during the use of the valve. A spiral wound gasket prepared by placing a filler such as asbestos, inorganic paper, expanded graphite or PTFE upon a metal hoop having a V-shaped cross section and spirally winding the laminate under tension is preferably used.

Figure 6:
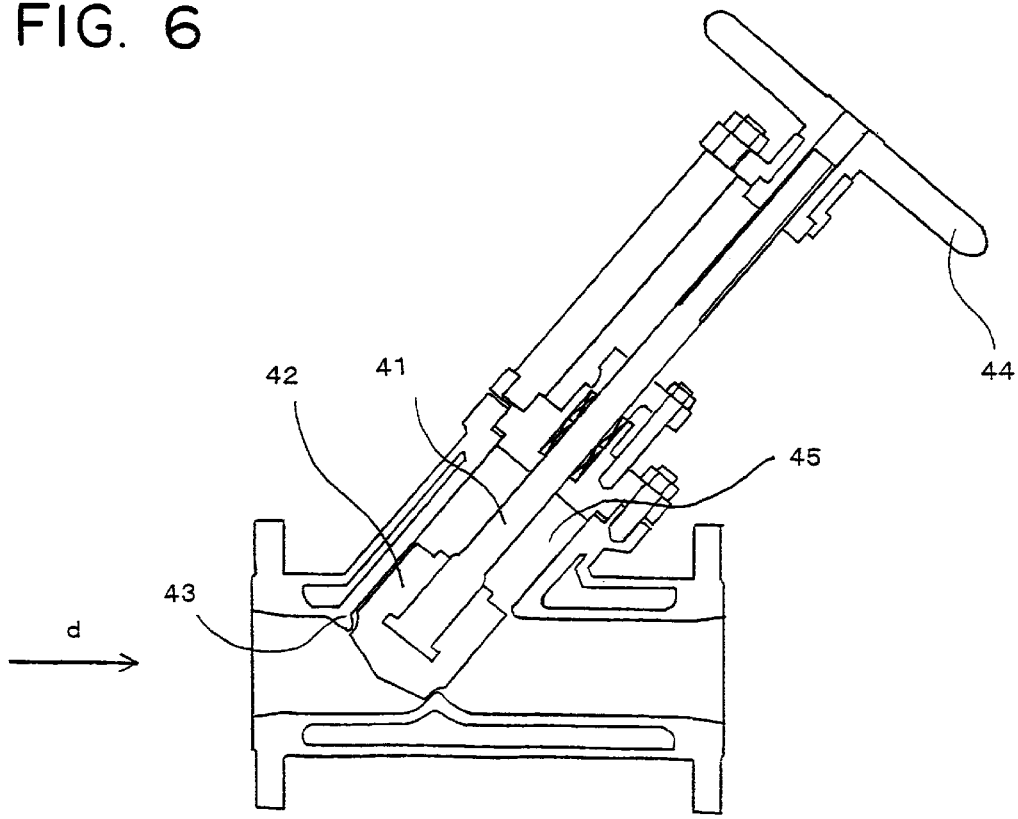
FIG. 6 is a sectional view of an example of a Y-shaped globe valve according to the present invention.

In the present invention, the Y-shaped globe valve is such as shown in FIG. 6 that a pipe and the stem of the valve are arranged into the form of letter Y. When the valve is opened, the stem can move not to disturb a flow of a reaction mixture in the pipe as much as possible.

The present inventors have paid attention to a globe valve as a valve which has a favorable influence upon the quality of a polycarbonate product.

Figure 5:
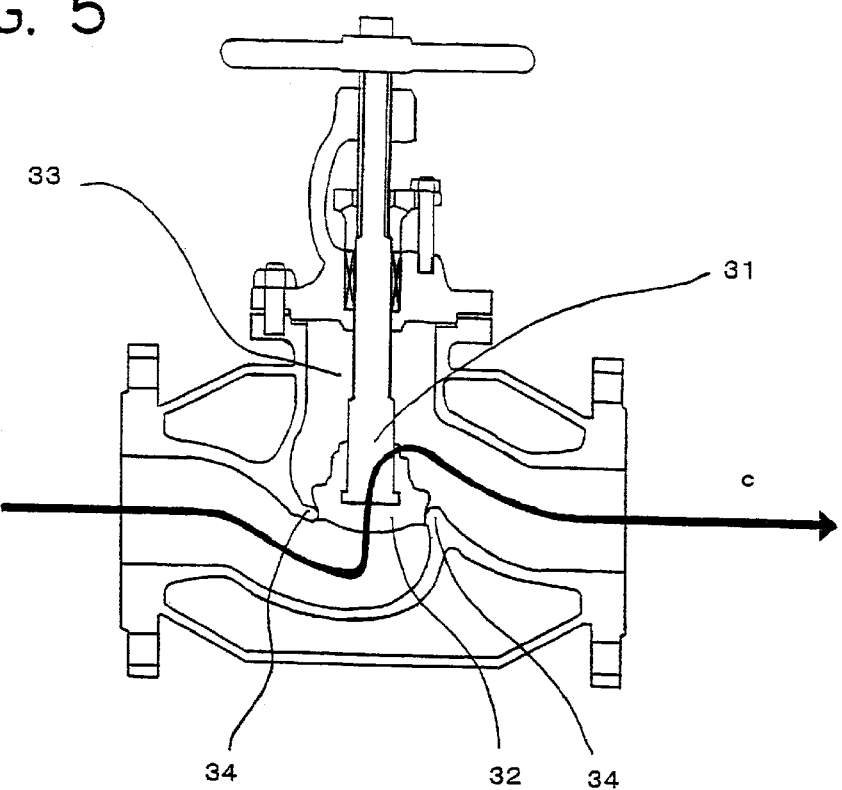
FIG. 5 is a sectional view of an example of a T-shaped globe valve of the prior art.

However, in a T-shaped globe valve of the prior art whose stem is moved in a direction perpendicular to a flow passage at the reaction mixture inlet port and outlet port of the valve, the problem of the reaction mixture residing in the above ball valve and plug valve and a residence portion in the clearance is slightly improved. Since the T-shaped globe valve has such a structure as shown in FIG. 5, it has a disk 32 having a larger diameter than that of a stem 31 at the end of the stem, a large residence space 33 is formed behind the disk 32, the reaction mixture in this residence space 33 becomes a residence portion which rarely receives the influence of a flow of a fluid (an upper portion of the residence space 33 of FIG. 5) unlike the ball valve and the plug valve, the cross section of the flow passage in the valve is greatly changed by the existence of a seat 34 which receives the disk 32, and the flow of the fluid greatly changes its direction as shown by an arrow "c". Therefore, it has been found that the T-shaped globe valve has such a problem that the flow is disturbed, thereby producing a great pressure loss, and that this problem becomes more serious as the viscosity of the fluid increases.

In contrast to this, in the Y-shaped globe valve shown in FIG. 6, a disk 42 is provided at the end of a stem 41 which is arranged at an angle to a flow direction of a reaction mixture, a flow of the passing fluid shown by an arrow "d" is stopped by contact between the disk 42 and a seat 43 provided in a fluid passing portion, the stem 41 and the disk 42 are moved in the direction of a handle 44 by turning the handle 4 in a certain direction, the flow of the passing fluid shown by the arrow "d" is resumed, the volume of a space 45 behind the disk 42 is reduced by the moving stem 41 and disk 42 at this point, the disturbance of the flow of the reaction mixture is smaller than that of an ordinary T-shaped globe valve, and a pressure loss is small when the fluid passes through this portion, whereby the retained reaction mixture has small chances of going into the flow of the reaction mixture incidentally and the residence portion (portion corresponding to the space 33 in FIG. 5) shown by the space 45 formed behind the disk is small. Therefore, it has been found that this Y-shaped globe valve is suitable as a valve for stopping the polycarbonate.

When the valve has substantially no leakage under a vacuum pressure of $40,000 \times 10^{-6}$ MPa or less and its liquid contact portion is made from a material having corrosion resistance against a monohydroxy compound formed by a reaction between the aromatic diol compound and the carbonic acid diester compound, it has been verified that the valve can stand long-time use of 1 year or more and produce good results in the maintenance of the quality of a polycarbonate product as a device for producing a polycarbonate.

However, even in this Y-shaped globe valve, it has been revealed that, when the valve is fully opened, a non-negligible residence portion remains behind the disk (space 45 in FIG. 6) and the effect of reducing a residence portion may be unsatisfactory for the quality of a product according to the use conditions of the valve such as temperature, flow rate and viscosity as a device for producing a polycarbonate. Especially in a larger valve, this residence portion causes greater bad influence upon the quality of a product.

The residence portion formed in these valves causes the deterioration of a polycarbonate such as coloration, crosslinking or gelation and may exert a non-negligible influence upon product quality. This is an especially serious problem to be solved for a polycarbonate which is liable to reside and deteriorate in the residence portion.

The present inventors have tackled with the further improvement of the Y-shaped globe valve through studies on these valves and have found that a Y-shaped globe valve having the following features can solve the above problems completely.

Figure 7:
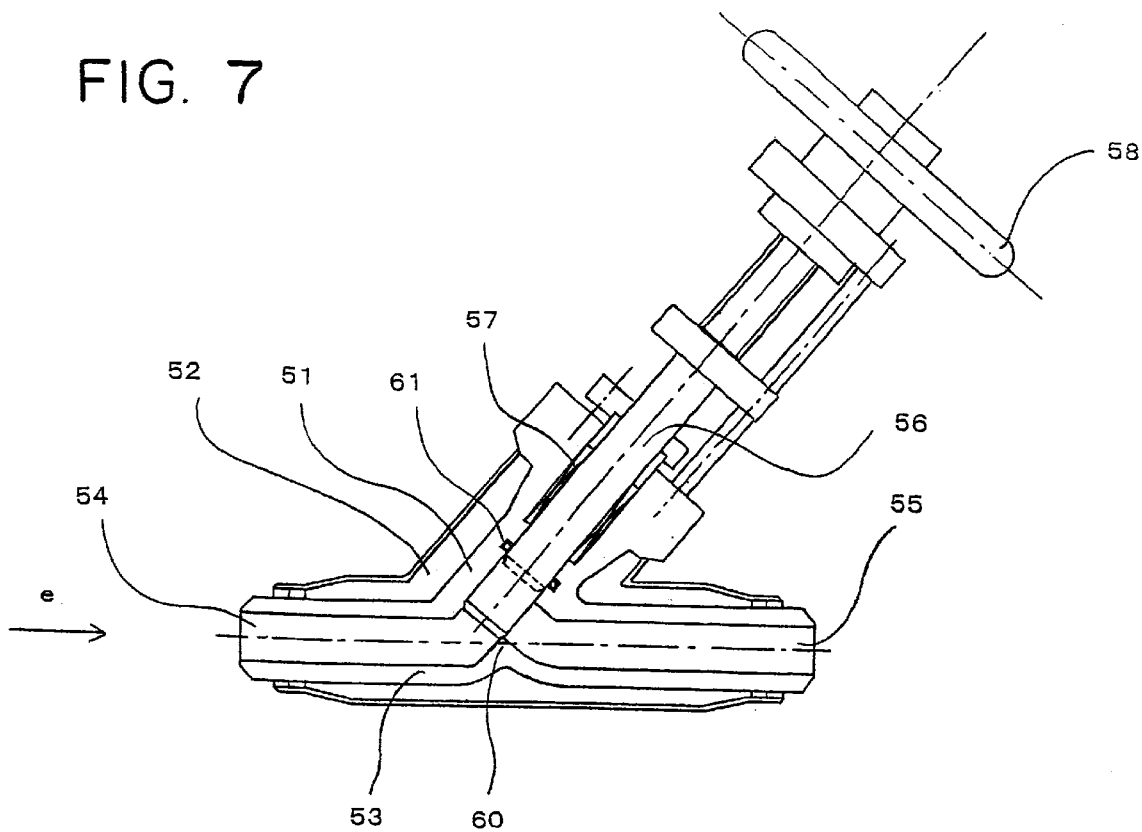
FIG. 7 is a sectional view of an example of a Y-shaped globe valve according to the present invention.

A preferred example of the valve of the present invention is shown in FIG. 7. The example shown in FIG. 7 is mere an embodiment of the present invention, and it should be understood that the present invention is not limited by this figure.

In FIG. 7, reference numeral 51 denotes a valve body. This valve body 51 is covered with a heating medium jacket 52 therearound. A reaction mixture inlet port 54 is provided at one end of the tubular portion 53 of the valve body 51 and a reaction mixture outlet port 55 is provided at the other end. A stem 56 is provided in a center portion of the valve body 51 and can be slid vertically by operating a handle 58 while it is sealed with a gland packing 57. A flow of a fluid is cut off when an end portion of the stem 56 contacts a seat 60. Closing the valve indicates this state and is shown by a solid line in FIG. 7. Meanwhile, fully opening the valve indicates the opposite state and is shown by a broken line in FIG. 7. The valve is fully opened to flow a reaction mixture.

The valve body 51 is made from the above corrosion-resistant material and the stem 56 is also made from the same material. Since they are made from the same material, even if the temperatures of the valve body 51 and the stem 56 rise, the clearance between them is maintained at a fixed value, rarely becomes larger than a designed value or suppresses contact between them because the coefficient of thermal expansion of the valve body 51 and the stem 56 are the same. This is preferred from the view point of reducing the residence portion. Theseat60 is made from the above sealing material such as STELLITE FACE#6 to prevent the seizure of the valve body 51 and the stem 56 and to enable sealing properties to be retained for a long time.

Reactors are connected by a pipe and the valve is generally installed in the pipe. In FIG. 7, the reaction mixture inlet port 54 and the reaction mixture outlet port 55 are butt welded (butt welded joint) to the pipe.

In FIG. 7, reference notation 54 denotes the reaction mixture inlet port and 55 the reaction mixture outlet port. It merely means that this arrangement is very common, and the reaction mixture inlet port and the reaction mixture outlet port may be installed in opposite directions according to the actual installation space.

The reaction mixture is supplied continuously from the reaction mixture inlet port 54 by the valve thus constituted. When the valve is opened, the reaction mixture is discharged to the outside of the system from the reaction mixture outlet port 55. When the valve is closed, the reaction mixture is shut off and does not flow to the reaction mixture outlet port 55.

The above Y-shaped globe valve according to the present invention has such a great improvement that a residence portion behind the disk is eliminated to remove a space behind the disk because it has no disk at the end of the stem and a portion into which the stem is inserted of the valve body and the stem have substantially the same thickness.

The expression "have substantially the same thickness" means that the thickness of the stem is smaller than that of the portion into which the stem is inserted of the valve body by a clearance required for the stem to slide in the valve body. The difference between the outer diameter of the stem and the inner diameter of the portion into which the stem is inserted of the valve body is preferably set to 2 mm or less. The difference is more preferably 1 mm or less, much more preferably 0.5 mm or less.

The cross section of the portion into which the stem is inserted of the valve body is desirably ±15% of the cross section of a portion through which the reaction mixture flows of the tubular portion to suppress the turbulent flow of the reaction mixture. It is more desirably the same as the inner diameter of the tubular portion.

Figure 8:
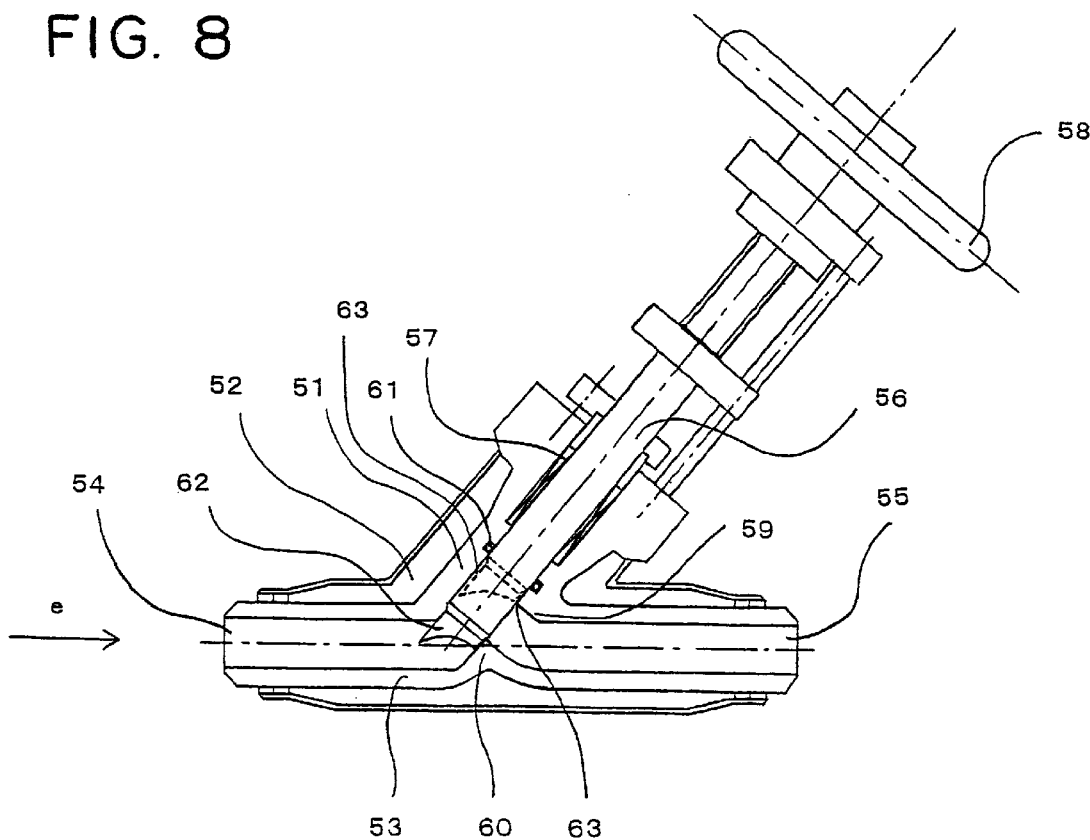
FIG. 8 is a sectional view of an example of a valve according to the present invention.

In FIG. 8, a spacer 62 having a smooth curved surface so as not to disturb the flow line of the running reaction mixture is provided at the end of the stem 56.

An end of the spacer 62 is smoothly connected to a portion 59 on a downstream side of the spacer 62, which is the inner surface of an upper portion of a tubular portion 53, when the valve is fully opened and the fluid flows in a direction "e" of FIG. 8. That is, the end of the spacer 62 which is the end portion of the stem of the Y-shaped globe valve and the inner surface of the upper portion of the tubular portion of the valve have a curved surface so that they can form a smooth curved surface when the valve is opened. The curved surface is shown by a broken line in FIG. 8. Other numerals in FIG. 8 signify the same elements as those of FIG. 5.

In the present invention, for example, the spacer 62 is provided at the end portion of the stem 56 to form a smooth curved surface not to disturb the flow of the reaction mixture. The formation of this smooth curved surface reduces the residence portion without disturbing the flow of the fluid as much as possible and can prevent the deteriorated polymer which caused in the residence portion which still exists in the present invention from flowing into the flow of the fluid by the turbulent flow of the fluid.

The Y-shaped globe valve shown in FIG. 7 does not have a structure that provides a smooth curved surface so as not to disturb the flow of the reaction mixture when it is fully opened. Therefore, the present invention shown in FIG. 8 has been accomplished based on the discovery of a new fact that this structure is one of the causes of deteriorating the quality of a polycarbonate product.

The expression "formation of this smooth curved surface" as used herein means the formation of a substantially smooth curved surface. For example, in FIG. 8, the diameter of the spacer 62 is made a little smaller than the diameter of the stem 56 to realize perfect contact between the stem 56 and the seat 60 when the valve is closed. Therefore, when the valve is closed, 1 to 0.5 mm space 63 is formed between the spacer 62 and the valve body 51. "The formation of a gentle curved surface" in the present invention comprehends a case where the smooth curved surface becomes partly discontinuous by the space 63.

Further, a clearance is required between the stem and the valve body for the stem to slide in the structure of the valve. It has been found that the provision of an O ring (denoted by notation 61 in FIG. 7 and FIG. 8) having excellent heat durability and corrosion resistance in this portion is more effective so that the stem can slide substantially in contact with the inner surface of the O ring. This can effectively prevent a retained product of the fluid from flowing into the reaction mixture, which can take place in the clearance as well. A preferred example of the O ring used for this purpose is an O ring made from a perfluoro elastomer (for example, Kalrez of Du Pont Dow Elastomers.) Preferably, the Y-shaped globe valve of the present invention is uniformly heated by a heating medium jacket, electric heater or the like. In the case of a heating medium jacket, to integrate the heating medium jacket with the valve body as shown in FIG. 5 is more preferred than to cover the Y-shaped globe valve of the present invention with the heating medium jacket from the viewpoint of uniform heating. When the Y-shaped globe valve of the present invention is relatively large in size, it is preferred to provide a baffle plate in the heating medium jacket or to increase the number of the flow passages of a heating medium so as to uniformly heat the Y-shaped globe valve of the present invention.

In the valve of the present invention, the surface roughness of the inner portion of the liquid contact portion is preferably 10 $\mu$m or less. This surface roughness is 10 $\mu$m or less, preferably 3.3 $\mu$m or less in terms of Rmax. For example, the liquid contact portion is finished with a buff of #200 or more, has a gloss higher than that of a standard sample and is free from pin holes, circular fine streaks, scratches, level differences and dimples. More preferably, the liquid contact portion has a surface roughness of 1.6 $\mu$m or less in terms of Rmax. That is, it is finished with a buff of #300 or more, or subjected to finishing such as honing, super finishing, lapping, liquid honing, chemical polishing or electrolytic polishing. In the present invention, Rmax was measured in accordance with JIS B0601-1982.

In the valve of the present invention, the term "heat durability" as used herein means that the air tightness and pressure durability of the valve are higher than required air tightness and pressure durability during operation even when the strength of the material at a high temperature becomes lower than a value at normal temperature and any problem does not arise in its use even when the valve receives force such as the thermal expansion of its material.

When a polycarbonate is produced, the heat durability temperature of the equipment is preferably set to a range of 150 to 350° C. according to its operation conditions. When the heat durability temperature is higher than 350° C., the material is limited, its processing becomes difficult, the obtained valve becomes expensive, a wide clearance must be formed between the parts of the valve to eliminate the influence of the thermal expansion of the material constituting the valve, and the residence and deterioration of the reaction mixture in this portion readily occur disadvantageously.

The inside of the valve of the present invention preferably has a pressure durability of 0.1 MPa or more. The expression "pressure durability of 0.1 MPa or more" means that the valve does not leak a liquid or gas to the outside of the valve or to a secondary side and does not cause any problem at all in its use whether it is opened or closed, even when a predetermined pressure of 0.1 MPa or more is applied to the inside of the valve, when a side which is shut off by the stem and to which pressure is applied when the valve is closed is called "primary side" and a side to which pressure is not applied is called "secondary side". The pressure durability is generally in the range of 0.1 to 30 MPa. When the clearance near the sealing portion (surface for separating the primary side from the secondary side) of the stem of the valve must be made wide in design (difference of diameter is 2 mm or more) to prevent leakage (also called "inner leakage") from the above primary side to the secondary side, the pressure durability of the primary side against the secondary side may be made lower than pressure durability against the outside of the valve.

Means of connecting the Y-shaped globe valve of the present invention to the pipe or the like preferably has the same pressure durability, corrosion resistance and surface roughness for the liquid contact portion as those of the Y-shaped globe valve of the present invention. The connections device may be a flange, welding, grayloc or the like.

Power for opening and closing the Y-shaped globe valve of the present invention may be human power, air pressure, electricity, hydraulic pressure or any other which can move the stem. When the stem is moved by power, it is desired to incorporate a fail-safe mechanism by which the process becomes safe even when abnormality such as a power failure or disconnection occurs.

Figure 9:
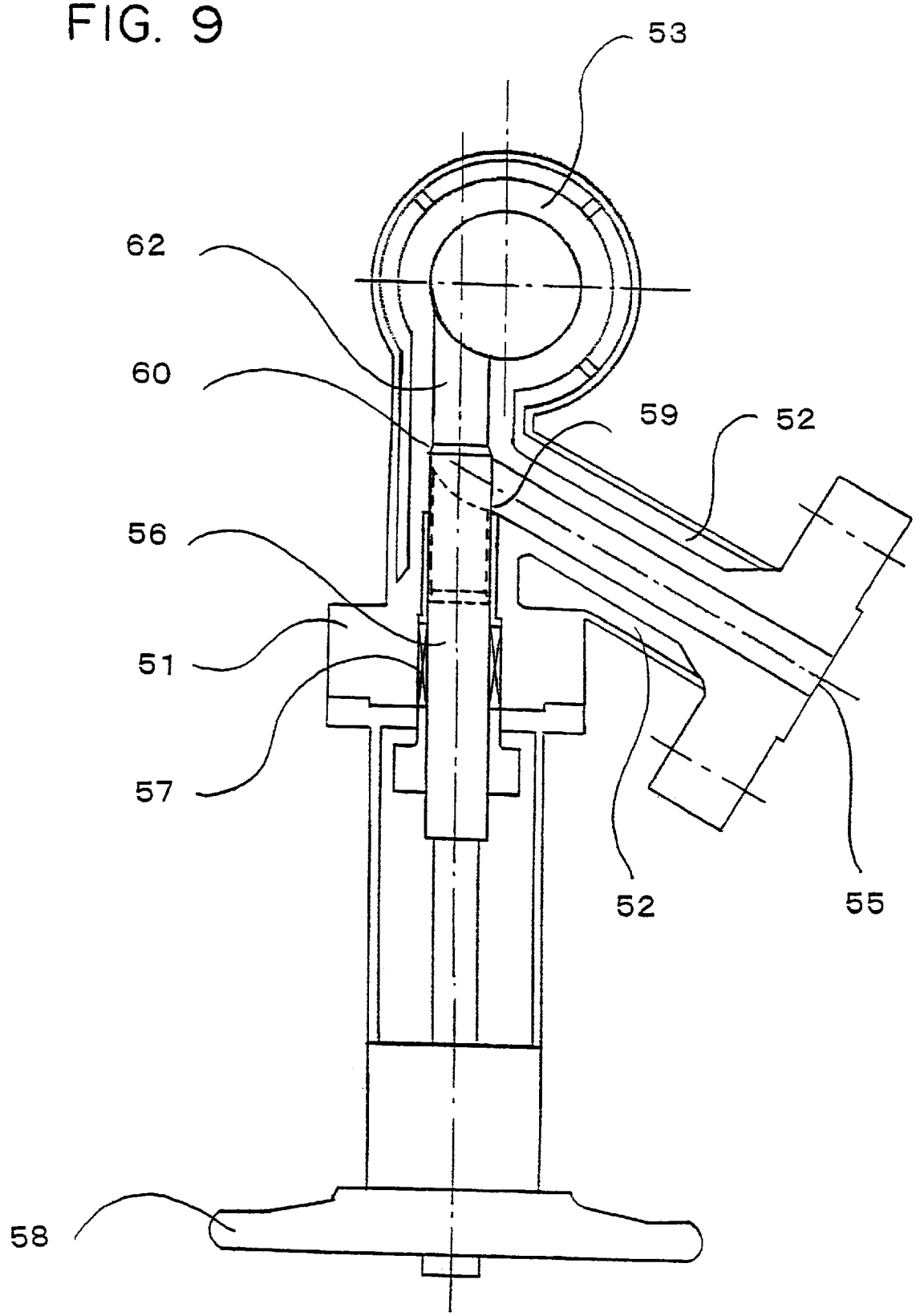
FIG. 9 is a sectional view of an example of a valve according to the present invention.

The Y-shaped globe valve of the present invention is installed in the pipe of the polycarbonate production equipment, between a vessel and the pipe, or in a branch of the pipe or the vessel. The Y-shaped globe valve may be used as a sampling valve for sampling the reaction mixture in the pipe by taking it out to the outside of the pipe, or in conjunction with a valve of another type. The Y-shaped globe valve is not limited to examples shown in FIGS. 6, 7 and 8 but it is needless to say that it is what is generally used as a Y-shaped globe valve. For example, as shown in FIG. 9, there is a Y-shaped globe valve at a location where the flow of the reaction mixture in a direction perpendicular to the plane of the sheet changes its direction to a downward direction and the liquid flows obliquely downward thereafter. Numerals in FIG. 9 denote the same elements as those of FIG. 7 and FIG. 8.

The material used for the Y-shaped globe valve of the present invention is preferably subjected to a heat treatment when the influence of residual stress upon the material at high temperatures is taken into consideration.

When the reaction mixture is not allowed to be leaked to the outside of the Y-shaped globe valve or when gas outside the Y-shaped globe valve is not allowed to enter the inside of the valve, bellows are used to seal a gland portion of the valve.

When the polycarbonate is not produced, a washing liquid, compressed air or vacuum air is supplied in place of the reaction mixture at the time of washing, start up or shut down the production of the polycarbonate, or inspecting the equipment. It has been confirmed that there is no problem with the function of the valve of the present invention in these cases.

It is considered that in the present invention, corrosion resistance becomes a problem for the reasons of not only the bad influence of the dissolved material such as the prevention of a reaction or the coloration of the polycarbonate but also the formation of a roughened surface probably by corrosion.

In concrete terms, excellent effects are provided when the material having corrosion resistance is stainless steel and the liquid contact portion is subjected to mechanical finishing such as buffing or to chemical finishing such as electrolytic polishing.

(2) Gear Pump;

The pump used in the production process of a polycarbonate is used at high temperatures under high vacuum. Since the viscosity of the reaction mixture rises to an extremely high level, generally 200 Pa·S to 1,000 Pa·S, which differs according to reaction conditions, along with the proceeding of the above reaction (reaching completion), when the reaction mixture is transferred by a pipe, the pressure of the pump must be raised in accordance with resistance (pressure loss) generated in the pipe. For this purpose, a gear pump has been generally used in the prior art.

However, as the gear pump of the prior art is made from tool steel having small coefficient of thermal expansion and excellent abrasion resistance, it is inferior in corrosion resistance against the raw materials of the reaction mixture, the material of the gear pump dissolves, the coloration of the reaction mixture occurs, and the dissolved material hinders the activity of a catalyst and reduces the reaction rate.

Since the reaction mixture as a product is used for the purpose of lubricating the gear, the reaction mixture which is exposed to high temperatures by heat generated by the gear and high shear for a long time deteriorates and returns into the product, thereby causing deterioration such as coloration, crosslinking or gelation. Thus, a non-negligible influence is exerted upon product quality.

Further, a residence portion is formed between a bushing which is the shaft end portion of the gear and the bearing of the gear and a cover plate (front plate and back plate). The additionally while section of the pipe at the inlet portion of the reaction mixture is generally circular, an upper portion of the gear generally has a rectangular shape, consequently the sectional shape of the inlet portion of the reaction mixture must be sharply changed to connect these sections having different shapes. Therefore, the residence portion is formed due to the difficulty of machining. Since the sealing of a fixed portion (not driven portion) is metal-to-metal sealing, a residence portion is formed when the gear pump is badly assembled.

The present inventors have conducted studies on the structure and properties of a gear pump for improving the problem of the prior art and efficiently obtaining a high-quality polymer which rarely produces a deteriorated product in the industrial production process of a polycarbonate. As a result, it has been found that a high-quality polycarbonate which rarely produces a deteriorated product of a polymer can be obtained by using the following gear pump.

That is, according to the present invention, there is provided a process for producing a polycarbonate resin through the melt polycondensation of an aromatic diol compound and a carbonic acid diester compound, wherein (2) gear pumps having the following structure and performance are used in the production process.

(2) gear pump; gear pump which has a heat durability of 150° C. or more, substantially no leakage under a vacuum pressure of $40,000 \times 10^{-6}$ MPa, a pressure durability of 0.1 MPa or more and a delivery pressure of 1 MPa or more, whose liquid contact portion is made from a material having corrosion resistance against a monohydroxy compound formed by a reaction between the aromatic diol compound and the carbonic acid diester compound, which can discharge a reaction mixture under a vacuum pressure of $40,000 \times 10^{-6}$ MPa or less, and which has such a structure that the reaction mixture for lubricating contact portions among a gear, a shaft and other gear pump members is discharged to the outside of the pump without returning into the pump.

A detailed description is subsequently given of the above gear pump (2).

Equipment comprising the gear pump of the present invention is not particularly limited and the present invention may be carried out in a batch or continuous system. When the batch system is used, two polymerization reactors are generally connected in series, a agitator equipped with a distillator is used for the first reactor, and a agitator without distillator is used for the second reactor to carry out a reaction under different conditions. In this case, it is preferred that both reactors be connected by a pipe equipped with a valve, equipment comprising a gear pump for transferring a reaction mixture as required be used to transfer the reaction product of the first reactor to the second reactor without exposing the reaction mixture to the outside air, and a reaction be carried out to a desired degree of polymerization in the second reactor.

When the continuous system is used, two or more reactors are generally connected in series, adjacent reactors are connected by a pipe equipped with a valve, equipment comprising a gear pump for transferring a reaction mixture as required is used to supply raw materials and a catalyst to the first reactor continuously while the reactors are maintained under different conditions, and a polycarbonate having a desired degree of polymerization is discharged continuously from the final reactor.

In the above equipment, a gear pump is required for the supply of the reaction mixture, and the gear pump installed in a vessel or pipe for this purpose plays an important role.

As described above, the polycarbonate is colored or produces a deteriorated product called "three-dimensionally crosslinked gel" when it receives long-time heat history though the influence of oxygen is completely eliminated.

This reduces the quality of the obtained polycarbonate and causes a serious problem in such application that requires high quality, for example, optical application.

To solve this problem, it is important to eliminate a residence portion called "dead space" in the equipment. Various studies have been made to eliminate the dead space in the reactor and various proposals have been made. However, the quality of a polycarbonate obtained by melt polymerization is still unsatisfactory in fact.

The present inventors have conducted intensive studies to solve this problem, have found that a gear pump to which importance was not attached before has a great influence upon the dead space of the whole equipment and have succeeded in greatly improving the quality of a polycarbonate obtained by melt polymerization by using a gear pump having a specific structure.

Figure 10:
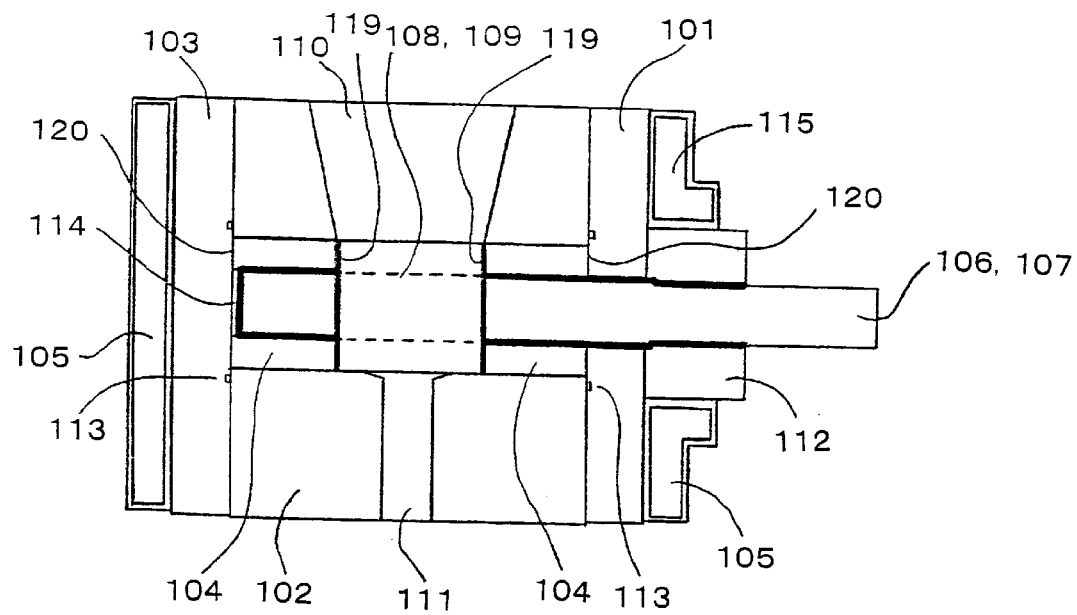
FIG. 10 is a transverse sectional view of an example of a gear pump according to the present invention.

In the present invention, a pump for transferring the reaction mixture is such as shown in FIG. 10.

In the gear pump of the present invention, the term "heat durability" as used herein means that the airtightness and pressure durability of the gear pump at high temperatures are higher than required air tightness and pressure durability during operation and any problem does not arise in its use even when the gear pump receives force such as the thermal expansion of its material. When a polycarbonate is produced, the heat resistance temperature of the equipment is preferably set to a range of 150 to 350° C. according to its operation conditions. When the heat resistance temperature is higher than 350° C., the material is limited, its processing becomes difficult, the obtained gear pump becomes expensive, a wide clearance must be formed between the parts of the gear pump to eliminate the influence of the thermal expansion of the material constituting the gear pump, and the residence and deterioration of the reaction mixture in this portion readily occur disadvantageously. Since there is a case where a bolt for tightening the parts constituting the gear pump is loosened by thermal expansion, tightening force is preferably increased according to use temperature.

In the gear pump of the present invention, the expression "substantially no leakage under a vacuum pressure of $40,000 \times 10^{-6}$ MPa or less" means that the leakage of gas from the outside of the gear pump is $120 \times 10^{-6}$ MPa·l/h or less based on 1 liter of the inner capacity when the ultimate vacuum degree of the gear pump is $13.3 \times 10^{-6}$ MPa. With this method for measuring the leakage of gas, the measurement may not be easy because the inner capacity of the gear pump is too small. In this case, when a helium leak test is carried out at $0.133 \times 10^{-6}$ MPa, $3 \times 10^{-5}$ ACC/S or less can be used instead. The measurement method is as follows.

a. Gas Leakage Measurement Method

The measurement of the leakage of gas is carried out by sucking gas inside the gear pump by a vacuum pump to reduce the pressure inside the gear pump to $13.3 \times 10^{-6}$ MPa, stopping suction and confirming after one hour that the pressure inside the gear pump is lower than a predetermined pressure. When the capacity of the gear pump is 1 liter, for example, the gear pump stands the test if the pressure inside the gear pump is lower than $133 \times 10^{-6}$ MPa one hour after the suction of the vacuum pump is stopped.

b. Helium Leak Test

Gas inside the gear pump is sucked by a vacuum pump to reduce the pressure inside the gear pump to $0.133 \times 10^{-6}$ MPa or less, a helium leak detector is connected to the gear pump and the vacuum pump, the gear pump is covered with a bag while suction by the vacuum pump is continued, helium is blown into the inside of the bag from the outside, and the leakage of helium into the inside of the gear pump is measured by the helium leak detector. If the leakage of the detected helium is $3 \times 10^{-5}$ ACC/S or less, the gear pump stands the test. The DLMS-TP3E of Nippon Shinku Gijutsu Co., Ltd. may be used as the helium leak detector.

ACC/S means atm·ecc/sec which indicates a volume at 1 atm. and normal temperature as the leakage of helium per unit sec.

To prevent the gear pump from being exposed to oxygen in the air substantially, the outside of the gear pump is preferably placed in 98 vol % or more of an nitrogen gas atmosphere. Stated more specifically, this is often carried out by blowing from the outside nitrogen gas into a portion where the interior portion and the exterior portion of the gear pump are separated from each other by a sealing portion, such as a drive shaft seal part and a joint between a front plate and a gear case.

In the gear pump of the present invention, the expression "pressure durability of 0.1 MPa or more" means that the gear pump does not leak a liquid or gas to the outside thereof and does not cause any problem at all in its use even when a predetermined pressure of 0.1 MPa or more is applied to the inside of the gear pump. The pressure durability is generally in the range of 0.1 to 30 MPa.

In the gear pump of the present invention, the expression "liquid contact portion is made from a material having corrosion resistance against a monohydroxy compound formed by a reaction between the aromatic diol compound and the carbonic acid diester compound" means that any material is acceptable as the material of the liquid contact portion if it does not impair the function of the gear pump and does not substantially dissolve into the product during the use of the gear pump. The material is desirably stainless steel specified by JIS such as SUS304, SUS304L, SUS316, SUS316L, SUS630, SCS13, SCS14, SCS16, SCS19, SUS440C, SUS420J2 or SCS2, alloy tool steel specified by JIS such as SKS or SKD, high-speed tool steel such as SKH, nitride steel, plating such as Cr or Ni, stellite face finished or carbon steel lined by a hot isotactic press (HIP) method. Out of these, stainless steel is particularly preferred. The gear, shaft, bushing and body may be made from the same material or different materials but they are preferably made from the same material so as to maintain a clearance between parts formed by thermal expansion at a fixed value from the viewpoints of the stability of the flow rate of a liquid, high delivery pressure and a reduction in dead space.

In the present invention, the material used for the gear pump is preferably subjected to a heat treatment when the influence of residual stress at high temperatures is taken into consideration.

Preferably, the gear pump of the present invention is substantially pulseless. The expression "substantially pulseless" means that a change in the flow rate of the reaction mixture discharged by the gear pump is ±5% or less, preferably ±1% or less, more preferably ±0.5% or less of a planned predetermined flow rate.

In the gear pump of the present invention, the term "delivery pressure" means the pressure of the reaction mixture discharged by the gear pump and this pressure is limited by the viscosity of the reaction mixture used. This is because, when the viscosity is low, the delivery pressure becomes high and the reaction mixture flows backward to the inlet side from the outlet side of the gear pump through a clearance between the gear and the gear, a clearance between the gear and the bushing and a clearance between the gear and the body (that is, a back flow).

Generally speaking, when the viscosity is 0.01 to 0.1 Pa·S, the delivery pressure is limited to about 1 MPa, when the viscosity is 0.1 to 1 Pa·S, the delivery pressure is limited to about 7 MPa and when the viscosity is more than 1 Pa·S, the delivery pressure is limited to about 7 to 30 MPa.

In the gear pump of the present invention, the expression "can discharge the reaction mixture under a vacuum pressure of $40,000 \times 10^{-6}$ MPa or less" means that the gear pump can transfer the reaction mixture pulseless at a predetermined flow rate and a predetermined delivery pressure even when the pressure at the inlet side of the gear pump is $40,000 \times 10^{-6}$ MPa or less. Generally speaking, this is an important function in the production of a polycarbonate where a reaction is carried out under vacuum.

In the gear pump of the present invention, the expression "liquid contact portion" means an inside portion contacting the reaction mixture of the gear pump. The portion includes not only a portion which directly contacts the flow of the reaction mixture but also a portion which the reaction mixture used for lubrication contacts or the reaction mixture may enter.

In the gear pump of the present invention, the expression "the surface roughness of the liquid contact portion is 10 $\mu$m or less" means that the surface roughness is 10 $\mu$m or less in terms of Rmax. The surface roughness is preferably 3.3 $\mu$m or less in terms of Rmax. Specifying a finishing method, the liquid contact portion is finished with the same finishing method illustrated in the above item of (1) Valve.

A groove is formed in the bushing of the gear pump of the present invention for the lubrication of the gear so that the reaction mixture on the outlet side is caused to flow between the gear and the bushing and between the shaft and the bushing for lubrication. Since the reaction mixture used for lubrication is deteriorated by the reception of high temperatures and high shearing force in many cases, it is important to discharge this reaction mixture to the outside as much as possible and not to return it into the flow of a product.

It is preferred to heat the gear pump uniformly with a heating medium jacket, electric heater or the like. In the case of a heating medium jacket, to integrate the heating medium jacket with the gear pump is more preferred than to cover the gear pump with the heating medium jacket from the viewpoint of uniform heating. When the gear pump is relatively large in size, it is preferred to provide a baffle plate in the heating medium jacket or to increase the number of the flow passages of a heating medium so as to uniformly heat the gear pump. When a flange is used to connect the gear pump, it is desired to provide a jacket for circulating the heating medium in the flange.

Any means may be used to connect the gear pump of the present invention to the pipe or the like if it has the same pressure durability, corrosion resistance and surface roughness for the liquid contact portion as those of the gear pump. For example, it is a flange, welding, grayloc or the like.

An electric motor is generally used to drive the gear pump of the present invention. A flexible joint is generally used to connect a drive source to the gear pump and desirably can absorb the eccentricity of a drive shaft caused by the thermal expansion of the gear pump or the like.

An upper limit of the current value of the motor or torque upper limit value is set to protect the gear pump when a metal piece bites the gear during the operation of the gear pump or when abnormal torque is applied to the gear by the deterioration or solidification of the reaction mixture in contact portions among the gear, the shaft and other gear pump members. When the current value of the motor reaches the upper limit, the motor is stopped, or a shear pin or torque limiter is used to disconnect the drive source from the gear pump at a value larger than a predetermined torque value.

The shaft seal of gear pump of the present invention is used to prevent the reaction mixture inside the gear pump excluding the reaction mixture used for lubrication from contacting the outside when the drive source for driving the gear and shaft is connected to the gear pump. Any shaft seal is acceptable if it has this function during operation, as exemplified by a mechanical seal, gland packing, sealing coupler, metal seal, ring seal, labyrinth seal, viscous seal and the like. The shaft seal can be used even when it does not contact the drive source. The connection style of the drive source to the gear pump is not limited to one.

A scraping blade is preferably provided at a shaft end portion (end portion of the shaft) of the gear pump of the present invention to prevent the reaction mixture from residing in the shaft end portion. The scraping blade may have any shape if it has a function to remove the reaction mixture from the shaft end portion. The scraping blade is, for example, a scraper, propeller, screw or the like. Considering production ease and the work efficiency of washing or the like, a simple shape is preferred.

To eliminate a gap between the bushing and the cover plate of the gear pump of the present invention, the bushing is preferably fixed to the cover plate (front plate or back plate). Fixing means is not particularly limited but may be a bolt, welding or the like.

The flow passage of the reaction mixture at the inlet port of the gear pump of the present invention, that is, the flow of the reaction mixture at an inlet port portion of the reaction mixture is preferably smooth to prevent the flow line of the reaction mixture from being disturbed. Particularly preferably, the restriction angle of the flow passage is 45° or less in terms of vertical angle. Preferably, the flow passage of the reaction mixture has substantially no level differences except for a required portion for supplying the fluid. The level difference of the required portion for supplying the fluid is the level difference of gear teeth. The expression "has substantially no level differences" means that an end portion is chamfered 2 mm or less, preferably 0.5 mm or less, more preferably 0.1 mm or less.

In the gear pump of the present invention, the sealing of the fixed portion is the sealing of a gap between parts excluding the shaft and the gear which are movable portions of the gear pump. For example, a gap between the front plate and the gear case, a gap between the back plate and the gear case, a gap between the bushing and the cover plate, and a gap between the pipe and the gear pump are sealed up. This sealing is metal-to-metal sealing which is effected by surface finishing these parts and making them parallel to each other or sealing with a liquid packing. In this case, the surface finish is preferably 25 $\mu$m or less, more preferably 6.3 $\mu$m or less in terms of Rmax. Metal-to-metal sealing is generally used but other sealing such as sealing with a liquid packing may be used.

Particularly when the gear pump is used under vacuum, as only metal-to-metal sealing is insufficient in many cases, an hollow metal O ring is preferably used.

However, it has been found that the hollow metal O ring has such an advantage that, when a hollow metal O ring is used as a seal, even if vacuum sealing and also metal-to-metal sealing are insufficient, the reaction mixture does not leak to the outside of the gear pump from the hollow metal O ring, thereby making it possible to minimize a dead space formed in a portion where the reaction mixture leaks.

Therefore, in a case other than the case where the pressure inside the gear pump is lower than atmospheric pressure, use of the hollow metal O ring is desired from the viewpoint of minimizing the dead space. For this purpose, the hollow metal O ring is desirably placed near the liquid contact portion of the reaction mixture as much as possible.

An example of the gear pump of the present invention will be described hereinafter with reference to FIG. 10 and FIG. 11. The example shown in FIG. 10 and FIG. 11 is mere an embodiment of the present invention, and it should be understood that the present invention is not limited by these figures.

Figure 11:
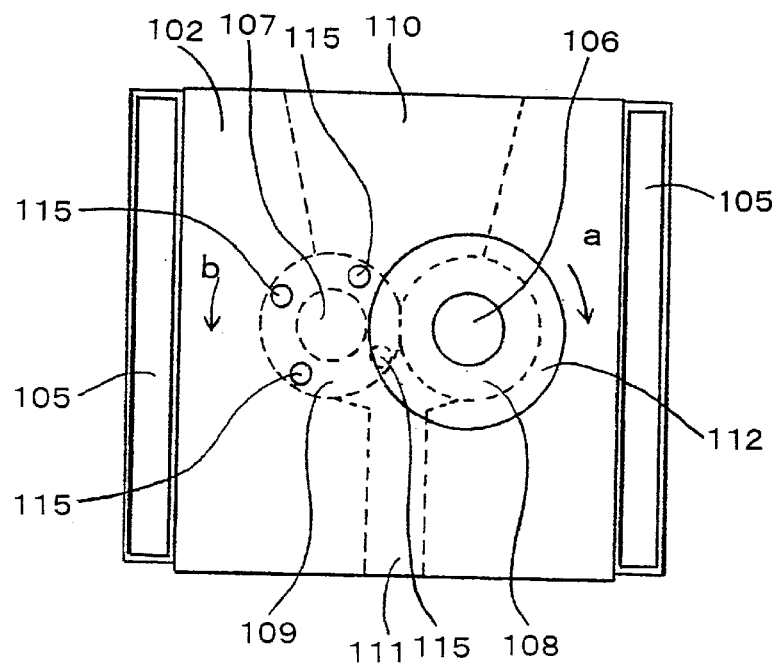
FIG. 11 is a transverse sectional view of an example of gear pump according to the present invention when seen from an axial direction.

In FIG. 10 and FIG. 11, reference notation 102 denotes a gear case. This gear case 102 is connected to an unshown drive unit which is located on a drive shaft seal 112 side of a driving shaft 106 and a follow shaft 107 (the drive shaft seal side of the driving shaft 106 and the follow shaft 107 is called "drive side" and the opposite side is called "counter-drive side" hereinafter). A front plate 101 is attached to the drive side of the gear case 112 and a back plate 103 is attached to the counter-drive side of the gear case 112 to form a body together with the gear case 102.

This body is covered with a heating medium jacket 105 therearound. A reaction mixture inlet port 110 is formed at one end of the gear case 102 and a reaction mixture outlet port 111 is formed at the other end of the gear case 102.

The driving shaft 106 is installed in the gear case 102 supported by a bushing 104 and provided with a gear 108. The driving shaft 106 is connected to the unshown drive unit on the drive side, and the gear 108 and the bushing 104 are sealed with the drive shaft seal 112 and separated from the outside of the gear pump.

A gear 109 is engaged with the gear 108 (see FIG. 11) and attached to the follow shaft 107 supported by the bushing 104 like the gear 108.

By the rotation of the driving shaft 106 by the unshown drive unit, the gear 108 turns in a direction "a", the gear 109 engaged with the gear 108 turns in a direction "b", the reaction mixture from the reaction mixture inlet port 110 enters the valley portions of the gears 108 and 109 and rotates together with the gears 108 and 109 while it contacts the inner wall of the gear case 102, is forced out of the valley portions of the gears 108 and 109 when the gears 108 and 109 engage with each other on the reaction mixture outlet port 111 side and is supplied to the reaction mixture outlet port 111.

Metal-to-metal sealing is effected for a gap between the front plate 101 and the gear case 102 and a gap between the back plate 103 and the gear case 102. When the insides of the reaction mixture inlet port 110 and the reaction mixture outlet port 111 become vacuum, metal-to-metal sealing may be insufficient in preventing leakage to the outside of the gear pump. Therefore, an O ring 113 is used for sealing. The O ring 113 serves as a seal for preventing the reaction mixture from leaking to the outside if metal-to-metal sealing should lose its effect owing to some trouble or the like.

Figure 13:
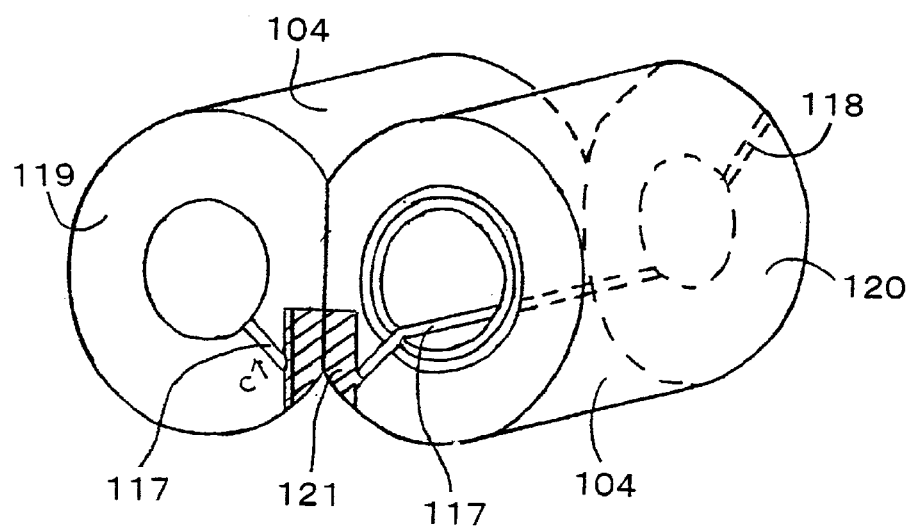
FIG. 13 shows an example of the lubricating flow passage of a reaction mixture formed by a gear pump according to the present invention.

The bushing 104 has a lubricating groove 117 which serves as the flow passage of the reaction mixture as shown in FIG. 13 so that the reaction mixture itself functions as a lubricant for lubricating sliding surfaces 119 between the bushing 104 and the gear 108 and between the bushing 104 and the gear 109 and interfaces between the bushing 104 and the driving shaft 106 and between the bushing 104 and the follow shaft 107 and then is discharged to the outside of the gear pump through an exhaust groove 118.

In FIG. 13, the reaction mixture for lubrication spreads to a lubricating reaction mixture inlet port 121 (shown by a slant line), passes through the lubricating groove 117 and flows in a direction "c" shown by an arrow.

Out of the bushings 104, one installed by the drive shaft seal 112 and the front plate 101 has no exhaust groove 118 and the discharged reaction mixture moves in the direction of the drive shaft seal 112 along the driving shaft 106, passes through a gap between the drive shaft seal 112 and the driving shaft 106, and is discharged to the outside of the gear pump while it seals up the gap where a liquid film is formed.

The "contact portions among the gear, the shaft and other gear pump members" denote portions shown by bold lines in FIG. 10. The word "contact" as used herein does not always mean direct contact but means that the reaction mixture generally lies in these portions as a lubricant.

In the gear pump of the present invention, means of discharging the reaction mixture used for lubrication to the outside of the system is not particularly limited. The means may be an exhaust port formed in the front plate or the back plate.

Figure 12:
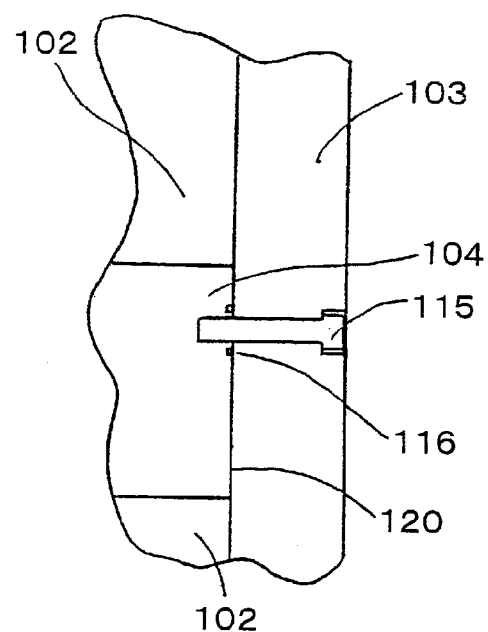
FIG. 12 shows a bushing fixed to a cover plate.

The bushing 104 is fixed to the front plate 101 and to the back plate 103 by a bushing fixing bolt 115 as shown in FIG. 11 and FIG. 12 and sealed with an O ring 116 to prevent the reaction mixture inside from leaking to the outside of the gear pump or the outside air from entering the gear pump.

Since the bushing 104 is fixed like this, the clearance between the bushing 104 and the gear 108 and the clearance between the bushing 104 and the gear 109 are maintained at a fixed value, the stability of quantitative supply by the gear pump is improved and the self-cleaning properties of the sliding surfaces 119 between the gear 108 and the bushing 104 and between the gear 109 and the bushing 104 are improved compared with a gear pump in which the bushing 104 is not fixed like this. Therefore, this has a great effect in reducing the dead space.

A scraper 114 having straight thin protrusions is provided at an end portion on the counter-drive side of the driving shaft 116 and both end portions of the follow shaft 107 as shown in FIG. 10 so that the reaction mixture at the end portions of the shafts is stirred by the rotation of the shafts, is prevented from residing in these end portions and can be discharged to the outside smoothly.

The front plate 101, the gear case 102 and the back plate 103 are preferably made from stainless steel such as SUS420J2, and the driving shaft 106, the follow shaft 107 and the gears 108 and 109 are preferably made from the same material.

An advantage obtained by making elements from the same material is that even when the temperature of the gear pump is elevated to the operation temperature, a clearance between them is maintained at the same value as that at room temperature because they have the same coefficient of thermal expansion, thereby making it possible to maintain the clearance in the gear pump at a design value. This can prevent the formation of a dead space caused by an increase in the size of the clearance, an increase in the amount of generated heat due to a reduction in the size of the clearance and the gear pump from losing its function when it contacts another element.

Reactors are connected by a pipe and the gear pump is installed in the pipe. Not shown in FIG. 10, the reaction mixture inlet port 110 and the pipe are connected by a flange and the reaction mixture outlet port 111 and the pipe are also connected by a flange, and a metal O ring is used for sealing.

The metal O ring used is preferably surface plated to prevent seizure. It is plated with nickel or silver, for example.

The flow passage of the reaction mixture at the reaction mixture inlet port 110 is restricted at an vertical angle of 20° and is used to supply the reaction mixture to the gear portion. That is, the restriction angle of the flow passage at the reaction mixture inlet port of the gear pump is 20°.

The reason why the flow passage must be restricted is that the cross section of a connection pipe is generally circular and the cross section of the reaction mixture inlet port formed by the gear 108, the gear 109 and the gear case 102 of the gear pump is rectangular. This restriction angle is preferably as smooth as possible to prevent the formation of a dead space by disturbing the flow line of the reaction mixture.

The surface of the flow passage of the reaction mixture, that has a surface roughness of 1.6 $\mu$m or less in terms of Rmax to prevent the formation of a fine dead space on the surface of the liquid contact portion.

In the gear pump constituted as described above, the reaction mixture is supplied continuously from the reaction mixture inlet port 110 and discharged quantitatively from the reaction mixture outlet port 111 to the outside at a predetermined flow rate and pressure.

When a polycarbonate resin is not produced, a washing liquid, compressed air or vacuum air is supplied in place of the reaction mixture at the time of washing, start up or shut down the production of the polycarbonate, or inspecting the equipment. It has been confirmed that there is no problem with the function of the gear pump in these cases like the reaction mixture.

(3) Flange;

A portion for connecting a pipe with another pipe or a pipe with a vessel used in the production process of a polycarbonate is used at high temperatures under high vacuum, and the viscosity of the reaction mixture rises to an extremely high level, generally 200 to 10,000 Pa·S, which differs according to reaction conditions, along with the proceeding of the above reaction (reaching completion). To transfer the reaction mixture by a pipe, as the pressure in the pipe rises in accordance with resistance (pressure loss) generated in the pipe, a flange must stand a high pressure of 0 to 30 MPa. Therefore, the flange must have pressure durability, sealing durability and heat durability.

The pipe must be connected or disconnected for maintenance at a construction site and there is a tendency toward an increase in the number of pipe joints for the reason of the limitations of tools or the like so as to finish the inner surface of the pipe to a predetermined surface roughness by polishing.

For these purposes, a flange specified by JIS B2210-1840 has generally been used heretofore.

Since a gasket is inserted between conventionally used flanges and tightened by a bolt and a nut to connect the flanges, the centers of the pipes are shifted from each other by the tolerance of the hole of the bolt, whereby a level difference is generated in the flange connection portion, or a gap is formed between the flanges by the gasket, thereby forming a dead space.

The stability of temperature in the pipe is also an important problem for a polycarbonate product whose quality is easily influenced by temperature variations. Although the pipe is generally heated by a heating medium jacket or electric heater, a reduction in temperature easily occurs in the flange portion due to heat radiation because it has a large area, costs are boosted by heating, and heating is liable to become unsatisfactory.

It is an object of the present invention to provide a flange which improves the above problems of the prior art and is used in an industrial process for efficiently obtaining a high-quality polycarbonate which rarely produces a deteriorated product.

According to studies conducted by the present inventors, it has been found that a polycarbonate which rarely produces a deteriorated product of a polymer and has high quality can be obtained by using a flange having the following structure and characteristic properties.

That is, according to the present invention, there is provided a process for producing a polycarbonate resin through the melt polycondensation of an aromatic diol compound and a carbonic acid diester compound, wherein flanges having the following structure and performance are used in the production process.

(3) flange; flange which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, and which has a heating medium jacket therein.

The flange (3) of the present invention will be described in detail hereinafter.

Equipment comprising the flange of the present invention is not particularly limited and the present invention may be carried out in a batch or continuous system. When the batch system is used, two reactors are generally connected in series, a stirrer equipped with a distillation column is used for the first reactor, and a stirrer without distillation column is used for the second reactor to carry out a reaction under different conditions. In this case, it is preferred that both reactors be connected by a pipe, equipment comprising a pump for transferring the reaction mixture as required be used to transfer the reaction product of the first reactor to the second reactor without exposing the reaction mixture to the outside air, and a reaction be carried out to a desired degree of polymerization in the second reactor.

When the continuous system is used, two or more reactors are generally connected in series, adjacent reactors are connected by a pipe, the equipment comprising a pump for transferring the reaction mixture as required is used to supply raw materials and a catalyst to the first reactor continuously while the reactors are maintained under different conditions, and a polycarbonate having a desired degree of polymerization is extracted continuously from the final reactor.

In the above production process, pipes must be connected to supply the reaction mixture, and flanges installed in vessels and pipes for this purpose play an important role.

The present inventors have found that a flange which is a pipe joint has a great influence upon the dead space of the whole equipment, the stability of temperature is an important factor for a polycarbonate whose product quality is easily influenced by temperature because crystallization is caused by a drop in temperature or heat deterioration is caused by a rise in temperature, and the flange portion easily experiences a drop in temperature by heat radiation due to its large surface area and has a great influence upon the stability of the temperature of the reaction mixture. The present inventors have succeeded in greatly improving the quality of a reaction mixture obtained by melt polymerization using a flange having a specific structure.

Figure 14:
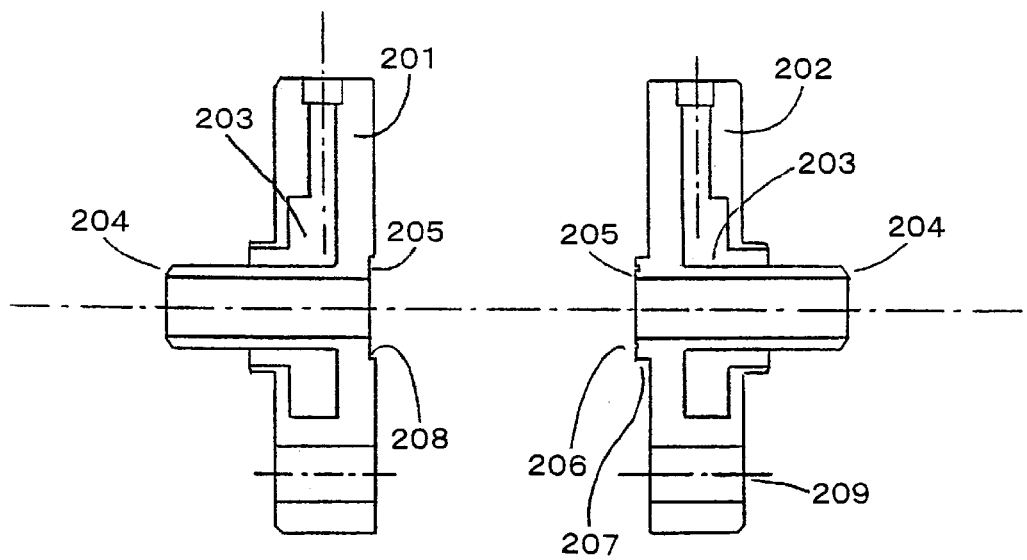
FIG. 14 is a sectional view of an example of a flange according to the present invention.

In the present invention, a flange attached to a pipe for transferring a reaction mixture has a structure shown in FIG. 14, for example.

In the flange of the present invention, the term "heat durability" as used herein means that the airtightness and pressure durability of the flange are maintained at required values during operation even at high temperatures and the flange has no problem in its use even when it receives force such as the thermal expansion of the material constituting the pipe.

When a polycarbonate is produced, the heat durability temperature of the equipment is preferably set to a range of 150 to 350° C. according to its operation conditions.

Since there is a case where a bolt for tightening parts constituting the flange is loosened by thermal expansion, tightening force is preferably increased according to use temperature.

In the flange of the present invention, the expression "substantially no leakage under a vacuum pressure of $40,000 \times 10^{-6}$ MPa or less" means that the leakage of gas from the outside of the pipe is $120 \times 10^{-6}$ MPa·l/h or less based on 1 liter of the inner capacity when the ultimate vacuum degree of the pipe including the flange is $13.3 \times 10^{-6}$ MPa. With this method for measuring the leakage of gas, the measurement may not be easy because the inner capacity of the pipe including the flange is too small. In this case, when a helium leak test is carried out at $0.133 \times 10^{-6}$ MPa, $3 \times 10^{-5}$ ACC/S or less can be used instead.

The gas leakage measurement method (a) and the helium leak test (b) which have been described for the gear pump can be used as the measurement method.

An outside air contact portion of the flange is desirably placed in 98 vol % or more of a nitrogen gas atmosphere not to be exposed to oxygen contained in the air substantially.

In the flange of the present invention, the expression "pressure durability of 0.1 MPa or more" means that the flange does not leak a liquid or gas to the outside of the pipe and does not cause any problem at all in its use even when a predetermined pressure of 0.1 MPa or more is applied to the inside of the pipe. The pressure durability is generally in the range of 0.1 to 30 MPa.

In the flange of the present invention, the expression "liquid contact portion is made from a material having corrosion resistance against a monohydroxy compound formed by a reaction between the aromatic diol compound and the carbonic acid diester compound" means that any material is acceptable as the material of the liquid contact portion if it does not impair the function of the pipe and does not substantially dissolve into the product during the use of the flange. The material is desirably stainless steel specified by JIS such as SUS304, SUS304L, SUS316, SUS316L, SUS630, SCS13, SCS14, SCS16 or SCS19, plating such as Cr or Ni, stellite face finished or carbon steel lined by a hot isotactic press (HIP) method. Out of these, stainless steel is particularly preferred. The pipe and the flange may be made from different materials but they are preferably made from the same material to reduce the influence of thermal expansion from the view point of the strength of the pipe.

In the flange of the present invention, the material of a gasket used for sealing the flange is preferably softer than the material of the flange body from the view point of sealing properties. Illustrative examples of the material include fluororesin (for example, Teflon), perfluoro elastomer resins (for example, Kalrez of Du Pont Dow Elastomers), Ti, Ni, Ag, Al, Cu, asbestos, SUS304, SUS304L, SUS316, SUS316L, SUS317L, SUS321, SUS347, SUS410 (these SUS are specified by JIS), monel metal, incoloy 800, Pb and the like. When the liquid contact surface has a problem with corrosion resistance, it is preferably plated with a material having high corrosion resistance. The gasket is preferably made from a material different from that of the flange body to prevent seizure. Stainless steel is particularly preferred.

In the flange of the present invention, the material used for the pipe is preferably subjected to a heat treatment when the influence of residual stress at high temperatures is taken into consideration.

The flange of the present invention is preferably heated uniformly with a heating medium jacket. In the case of a heating medium jacket, the flange may be covered with the heating medium jacket but is preferably integrated with the heating medium jacket by incorporating the heating medium jacket in the flange from the view point of uniform heating. When the flange is relatively large in size, it is preferred to provide a baffle plate in the heating medium jacket or to increase the number of the flow passages of a heating medium so as to uniformly heat the flange.

The surface roughness of the liquid contact portion of the flange of the present invention is preferably 10 $\mu$m or less. The surface roughness means that the surface roughness of the surface in contact with the reaction mixture of the flange is 10 $\mu$m or less in terms of Rmax.

The surface roughness is preferably 3.3 $\mu$m or less in terms of Rmax. Specifying a finishing method, the liquid contact portion is finished with the same finishing method illustrated in the above item of (1) value.

In the flange of the present invention, when the flange is connected to a pipe, they are generally connected by welding. However, a carbide is adhered to the inner surface of the pipe because a welded portion of the pipe is exposed to high temperatures, the welded portion or the inner surface of the pipe near the welded portion becomes uneven, and the center of the pipe is shifted by the influence of thermal stress, whereby level differences are produced. Therefore, it is preferred to carry out post-processing such as surface finishing by polishing.

In the present invention, any material may be used for the gasket used between flanges if it has required heat durability, pressure durability and corrosion resistance. When a hollow metal O ring is used by forming a groove, it has such an advantage that contact surfaces of the flanges can be easily made metal-to-metal sealing. The hollow metal O ring has another advantage that there is no dead space formed by the deformation or thickness of the gasket itself.

Further, since sealing properties are provided to the gasket by tightening a bolt and a nut to deform the gasket, the thickness of the flange is made large to provide tightening strength in many cases. However, since the hollow metal O ring has relatively smaller deformation force than other plate gasket or spiral wound gasket, it has still a further advantage that the thickness of the flange can be made relatively thin. Therefore, the hollow metal O ring is preferably used.

V/#3640 or V/#3641 of Nippon Balker Co., Ltd. or equivalent thereof is preferably used as the hollow metal O ring. The O ring may not have a circular shape and may have an oval or other shape if it surrounds the flow passage of the reaction mixture without a break.

In the flange of the present invention, a pin or a groove is preferably provided on the surface of the flange to prevent the shifting of the center of the flange. This groove structure is not particularly limited but it is the most preferred to shape a gasket seat for mounting the gasket like a groove in order to improve the fastening pressure of the gasket side and sealing properties.

In the flange of the present invention, it is preferred to effect metal-to-metal sealing for a gap between the flanges by surface finishing the flanges to a surface roughness of 25 $\mu$m or less, preferably 6.3 $\mu$m or less, more preferably 1.6 $\mu$m or less in terms of Rmax by calculating the crush margin of the gasket for the inner surface from the gasket seat and by machining the flanges with a lathe to make them parallel to each other from the view point of eliminating the dead space.

In the flange of the present invention, when the flange is connected to the pipe, the flow passage of the reaction mixture preferably has a smooth shape which does not disturb the flow line of the reaction mixture. Particularly preferably, the flow passage has the same inner diameter as that of the pipe connected thereto. When they cannot have the same diameter in production, they are connected smoothly at a restriction angle of 20° or less in terms of vertical angle. The restriction angle is preferably 10° or less, more preferably 5° or less, much more preferably 1° or less.

In the present invention, when the flange is relatively large in size and it is difficult to tighten a plurality of bolts and nuts uniformly, a spacer having such a thickness that the tightening pressure of the gasket becomes appropriate when the bolts and nuts are tightened is inserted into the gap between the flanges to limit the tightening distance of a screw portion, thereby making it possible to equalize the fastening of bolts and nuts. The insertion of the spacer can prevent the deformation of the flange caused by tightening the bolts and nuts excessively.

An example of the flange of the present invention will be described hereinafter with reference to FIG. 14. The example shown in FIG. 14 is a mere embodiment of the present invention, and it should be understood that the present invention is not limited by this figure.

FIG. 14 shows a pair of flanges. A flange (female) 201, a flange (male) 202 and an unshown pipe are made from SUS316. The flange (female) 201 and the flange (male) 202 are tightened to each other by unshown bolts and nuts with predetermined tightening torque. The flange (female) 201 and the flange (male) 202 incorporate a heating medium jacket 203 and are connected to each other by the unshown pipe so that the heating medium circulates to heat and keep warm the flange (female) 201 and the flange (male) 202.

The flange (female) 201 and the flange (male) 202 are butt welded to the unshown pipe at a pipe welded portion 204.

The flow passage of the reaction mixture is finished with a buff of #300 and has a surface roughness of 1.6 μm in terms of Rmax to reduce the resistance, an end portion is champfered 0.1 mm or less and the number of fine dead spaces on the metal surface of the reaction mixture as much as possible.

The flange (female) 201 and the flange (male) 202 are connected to each other in such a manner that a groove portion (male) 207 and a groove portion (female) 208 are combined together, and their connected surfaces have a surface roughness of 1.6 μm in terms of Rmax and are made parallel to each other by machining with a lathe or the like so as to effect metal-to-metal sealing for a gap between metal-to-metal sealing surfaces 205.

Vacuum sealing is effected by deforming an unshown hollow metal O ring inserted into a metal O ring attachment seat 206. The size of the groove is set such that the hollow metal O ring does not project from the groove and is deformed to obtain sealing properties.

The reaction mixture is sealed and separated from the outside by the metal-to-metal sealing surfaces 205 and the hollow metal O ring inserted into the metal O ring attachment seat 206. Owing to metal-to-metal sealing, there is no dead space in fact.

An unshown spacer is sandwiched between the flange (female) 201 and the flange (male) 202, and the flange (female) 201 and the flange (male) 202 are tightened to each other so that the distance between the flanges should be fixed, tightened more strongly with predetermined torque by elevating the temperature to use temperature and covered with an unshown heat insulating material.

When a polycarbonate resin is not produced, a washing liquid, compressed air or vacuum air is supplied in place of the reaction mixture at the time of washing, start up or shut down the production of the polycarbonate, or inspecting the equipment. It has been confirmed that there is no problem with the function of the flange of the present invention in these cases.

(4) Flow Passage;

The flow passage in the present invention refers to a space constituted by (i) pipes, (ii) a reaction mixture introduction passage from the inlet of the valve to the sealing surface forming portion (flow passage cut-off portion) of the valve, (iii) a reaction mixture discharge passage from the sealing surface forming portion of the valve to the outlet of the valve and (iv) connection parts for connecting these (such as a socket) and through which a reaction mixture flows, and (v) contacting portion of reaction mixture as final product (such as strand die).

In the polycarbonate production process, to obtain a high-quality polycarbonate for optical application, it is important to eliminate a residence portion called "dead spaces" in the transfer route. Various studies have been made to eliminate the dead space in the reactor and various proposals have been made. However, the quality of a polycarbonate obtained by melt polymerization is still unsatisfactory in fact.

The present inventors have conducted intensive studies in view of this problem and have found that a restricted and/or expanded portion of the flow passage to which importance has not been attached in the prior art, the curvature of the pipe and the connection of the pipe have a great influence upon the dead space of the whole equipment. They have succeeded in greatly improving the quality of a polycarbonate obtained by melt polymerization by using a reducer having a specific structure in the restricted and/or expanded portion of the flow passage.

In the present invention, the reducer for the flow passage for supplying the reaction mixture is, for example, a reducer as shown in FIG. 16.

In the flow passage (4) of the present invention, the expression "restricted and/or expanded portion of the flow passage" means a portion whose cross section is reduced or increased of the inside of a member such as a pipe or valve through which the reaction mixture flows. It means what is generally called "reducer" in the case of an ordinary pipe. The reducer is not limited to one specified by JIS but it means a liquid inlet portion of the gear pump, a restricted portion of a strand die, or a cross section changing portion of the flow passage through which the reaction mixture or the polycarbonate flows, such as a portion of the flow passage when the valve is fully opened, and comprehends what is not generally called "reducer".

In the flow passage of the present invention, the term "heat durability" means that the airtightness and pressure durability of the flow passage are higher than required air tightness and pressure durability during operation even at high temperatures and any problem does not arise in its use even when the flow passage receives force such as the thermal expansion of the material constituting the flow passage including the restricted and/or expanded portion. When a polycarbonate is produced, the heat durability temperature of the flow passage is preferably set to a range of 150 to 350° C. according to its operation conditions.

In the flow passage of the present invention, the expression "substantially no leakage under a vacuum pressure of $40,000 \times 10^{-6}$ MPa or less" means that the leakage of gas from the outside including the restricted and/or expanded portion is $120 \times 10^{-6}$ MPa·l/h or less based on 1 liter of the inner capacity when the ultimate vacuum degree of the flow passage including the restricted and/or expanded portion is 13.3×10$^{-6}$ MPa. Stated more specifically, the leakage is measured by sealing both end portions of the flow passage including the restricted and/or expanded portion.

In this case, the gas leakage measurement method (a) and the helium leak test (b) which have been described for the gear pump can be used the measurement method.

An outside air contact portion of the flow passage is desirably placed in 98 vol % or more of an nitrogen gas atmosphere not to be exposed to oxygen contained in the air substantially. This is particularly desirably carried out on a pipe joint portion of the pipe.

In the flow passage of the present invention, the expression "pressure durability of 0.1 MPa or more" means that the flow passage does not leak a liquid or gas to the outside of the flow passage and does not cause any problem at all in its use even when a predetermined pressure of 0.1 MPa or more is applied to the inside of the flow passage including the restricted and/or expanded portion. The pressure durability is generally a pressure at the outlet of the pump installed in the flow passage and in the range of 0.1 to 30 MPa.

In the flow passage of the present invention, the expression "liquid contact portion is made from a material having corrosion resistance against a monohydroxy compound formed by a reaction between the aromatic diol compound and the carbonic acid diester compound" means that any material is acceptable as the material of the liquid contact portion if it does not impair the function of the flow passage and does not substantially dissolve into the product during the use of the flow passage including the restricted and/or expanded portion. The material is desirably stainless steel specified by JIS such as SUS304, SUS304L, SUS316, SUS316L, SUS630, SCS13, SCS14, SCS16, SCS19, SUS440C, SUS420J2 or SCS2, corrosion resistant metal such as nickel or titanium, alloy such as inconel, nickel-chrome iron or hastelloy, plating such as Cr or Ni, stellite face finished, ceramic coating or carbon steel lined by a hot isotactic press (HIP) method. Out of these, stainless steel is particularly preferred.

In the present invention, the expression "liquid contact portion" means a reaction mixture contact portion of the inside of the flow passage including the restricted and/or expanded portion.

In the flow passage of the present invention, the expression "the surface roughness of the liquid contact portion is 10 μm or less" means that the surface roughness is 10 μm or less in terms of Rmax. The surface roughness is preferably 3.3 μm or less in terms of Rmax. Specifying a finishing method, the liquid contact portion is finished with the same finishing method illustrated in the above item of (1) value.

It is preferred to heat the flow passage including the restricted and/or expanded portion uniformly with a heating medium jacket, electric heater or the like. In the case of a heating medium jacket, to integrate the heating medium jacket with the flow passage body including the restricted and/or expanded portion is more preferred than to cover the flow passage including the restricted an/or expanded portion with the heating medium jacket from the viewpoint of uniform heating. When the flow passage is relatively large in size or when a change in the inner diameter of the flow passage is large due to the restricted and/or expanded portion, it is preferred to provide a baffle plate in the heating medium jacket or to increase the number of the flow passages of the heating medium so as to uniformly heat the flow passage.

In the present invention, any means may be used to connect the restricted and/or expanded portion of the flow passage to the pipe or the like if it has the same pressure durability, corrosion resistance and surface roughness for the liquid contact portion as those of the restricted and/or expanded portion. It is, for example, a flange, welding, grayloc, socket or the like. Welding is generally used.

In the present invention, a preferred feature of a connecting method with a pipe is a method by using a socket.

An example of the socket of the present invention is shown in FIG. 16.

FIG. 16 shows a pipe 301 before it is connected to a socket 303 and a pipe 302 connected to the socket 303. The liquid contact portion 305 of the pipes 301 and 302 and the socket 303 are finished to a surface roughness Rmax of 1.6 μm or less.

The contact surfaces with the socket 303 of the pipes 301 and 302 are finished to a surface roughness Rmax of 1.6 μm or less, and the contact surfaces 307 with the pipes 301 and 302 of the socket 303 are finished to a surface roughness Rmax of 1.6 μm or less as well. These contact surfaces of the pipes 301 and 302 and the socket 303 are machined with a lathe to achieve parallelism therebetween, thereby effecting metal-to-metal sealing for a gap between the contact surfaces 306 and 307 together with the above surface roughnesses.

After the pipes 301 and 302 are inserted into the socket 303, a groove portion 308 formed in the welding material 304 is welded.

Any welding material may be used for welding if it has strength required to connect the pipes to the socket, the same material of pipe is preferred as welding material and TIG welding is more preferred. The welding material for welding the pipes 301 and 302 to the socket 303 and the welding material 304 are SUS316 in FIG. 16.

Since only the surface portions of the pipe 301 and the pipe 302 (portions shown by slant lines in FIG. 16) are welded, the welding material 304 cannot be exposed to the inside of the pipe and contact the reaction mixture. Therefore, the surface finishing of the welded portion which has been required in the prior art is not necessary.

The reaction mixture is perfectly separated from the outside by metal-to-metal sealing and welding for a gap between the socket 303 and the pipe 301 and a gap between the socket 303 and the pipe 302. Therefore, the reaction mixture does not enter the gaps formed between these sealed surfaces. Even if it enters the gaps, it is extremely small in quantity and it is almost impossible that the reaction mixture entering the gaps deteriorates and the deteriorated product enters the flow of the reaction mixture by any chance.

Since the socket is much more compact than other connection means such as a flange and a jacket for heating the pipes can be laid in the socket when double pipe heat tracing are used, heat retaining properties are higher than other pipe joints.

In the present invention, the flow of the reaction mixture at the inlet portion of the reaction mixture of the restricted and/or expanded portion is desirably smooth to prevent the flow line of the reaction mixture from being disturbed. Particularly preferably, the restriction or expansion angle of the flow passage is 20° or less in terms of vertical angle. It is more preferably 14° or less in terms of vertical angle. The flow passage having substantially no level differences is preferably used. The expression "substantially no level differences" means that the end portion is preferably chamfered 2 mm or less, more preferably 0.5 mm or less, much more preferably 0.1 mm or less.

The vertical angle in this case is an angle shown by "α" when the flow passage is of a concentric type as shown in FIG. 17 and FIG. 18. When the flow passage is of an eccentric type as shown in FIG. 19 and FIG. 20, the vertical angle is an angle shown by "β".

In the present invention, when the restricted and/or expanded portion is used in a horizontal flow passage, a flow passage of an eccentric type is often used to prevent the formation of an air pool. In this case, the "horizontal flow passage" refers to a flow passage having an angle of 0 to 45° formed between the flow direction of the reaction mixture in the flow passage and the ground.

Examples of the restricted and/or expanded portion according to the present invention are shown in FIGS. 17 to 20. The examples shown in FIGS. 17 to 20 are mere embodiments of the present invention, and it should be understood that the present invention is not limited by these figures.

FIG. 17 and FIG. 18 show a reducer of a concentric type and FIG. 19 and FIG. 20 shows a reducer of an eccentric type. FIG. 17 and FIG. 18 show a reducer body 401 before it is welded to a pipe. A liquid contact portion 404 has a surface roughness of 1.6 μm in terms of Rmax and butt welded to the pipe at a welded portion 405 on a small pipe side 402 and a large pipe side 403.

Any welding material may be used for the welded portion 405 if it has strength required to connect the pipe to a reducer but TIG welding is preferred. The reducer body 401, the welding material and the pipe are made from SUS316. The welded portion is smoothly finished to a surface roughness of 1.6 μm in terms of Rmax to prevent the formation of a dead space by disturbing the flow line of the reaction mixture.

The restriction or expansion angle is α=20° for the flow passage of a concentric type shown in FIG. 17 and FIG. 18 and β=10° for the flow passage of an eccentric type shown in FIG. 19 and FIG. 20.

In the pipe including the reducer constituted above, the reaction mixture is continuously transferred.

In the flow passage of the present invention, a curved portion of the pipe for transferring the reaction mixture is formed by bending a pipe shown in FIG. 21, for example, with a bender. The term "pipe" as used herein means a pipe in a general sense but can. mean all flow passages through which the reaction mixture passes, such as a lubricating portion of the bearing of the gear pump or a flow passage portion of a strand die except for seat of the value.

In the present invention, the inside of the curved portion preferably has a smooth shape which does not disturb the flow line of the reaction mixture. The curvature of the pipe must be 5 times or more the inner diameter of the pipe, preferably 8 times or more the inner diameter of the pipe.

In the present invention, the angle of the curved portion is not fixed to 45°, 90° or 180° but may be any angle.

In the present invention, a curved portion having substantially no level differences in a welded portion or in the inside of the pipe is also preferably used. The expression "substantially no level differences" means that the end portion is preferably chamfered 2 mm or less, more preferably 0.5 mm or less, much more preferably 0.1 mm or less.

In the present invention, bending is cold bending with a pipe bender, burn bending or high-frequency bending. Cold bending is preferred because it does not cause a change in composition or the formation of a roughened surface by heating.

In the present invention, allowable flatness after bending should be 7.5% or less of the nominal diameter of the pipe. The cross section of the curved portion is desirably spherical at any location.

The "allowable flatness" as used herein indicates a percentage (%) obtained by subtracting the length of a short diameter from the length of a long diameter of the cross section of the curved portion and dividing the obtained value by the nominal diameter of the pipe when the cross section of the curved portion changes its shape to an oval shape.

The nominal diameter of the pipe used herein is specified by JIS G 3452-1988 and expressed as nominal diameter A.

An example of the curved portion according to the present invention is shown in FIG. 21. The example shown in FIG. 21 is a mere embodiment of the present invention, and it should be understood that the present invention is not limited by this figure.

In FIG. 21, a curved portion 406 is formed by bending a pipe and has a curvature radius "r" which satisfies r≧5×d (d is the inner diameter of the pipe). The bending angle is 90°.

Not shown, both ends of the curved portion are butt welded to pipes.

A welding material may be preferably used similar material of pipe if it has strength required to connect the pipe, but TIG welding is preferred. The curved portion 406, the welding material and the pipe are preferably made from stainless steel such as SUS316. The welded portion is smoothly finished to a surface roughness of 1.6 μm or less in terms of Rmax to prevent the formation of a dead space by disturbing the flow line of the reaction mixture.

The reaction mixture is continuously transferred in the pipe including the curved portion thus constituted.

EXAMPLES

The following examples of the present invention are given below. These examples are provided for the purpose of further illustrating the present invention but are in no way to be taken as limiting.

In the present invention, intrinsic viscosity and Rmax were measured as described in "a" and "b" below. The gas leakage measurement method of the present invention is carried out as described in "c". In the following examples, a helium leak test equivalent to the gas leakage measurement method of the present invention was used.

a. Intrinsic Viscosity

The intrinsic viscosity [η] was obtained by measuring a methylene chloride solution of the reaction mixture having a concentration of 0.7 g/dl with an Ubbelohde's viscometer.

b. Rmax Measurement Method

Rmax indicates surface roughness expressed in μm. Rmax is measured in accordance with JIS B0601.

c. Gas Leakage Measurement Method

The measurement of the leakage of gas is carried out by sucking gas inside the transfer members by a vacuum pump to reduce the pressure inside the transfer members to $13.3 \times 10^{-6}$ MPa, stopping suction by the vacuum pump and confirming after one hour that the pressure inside the transfer members is lower than a predetermined pressure when the capacity of the transfer members is 1 liter. The transfer members stands the test if the pressure inside the transfer members is lower than $133 \times 10^{-6}$ MPa one hour after suction by the vacuum pump is stopped.

Example 1

Diphenyl carbonate was charged into a dissolution tank equipped with a stirrer in an amount of 1.05 mols based on 1 mol of 2,2-bis(4-hydroxyphenyl)propane, the inside of the tank was substituted with nitrogen, 2,2-bis(4-hydroxyphenyl)propane was dissolved in diphenyl carbonate at 150° C., and the resulting mixture solution was transferred to a raw material storage tank maintained at 150° C.

Thereafter, the mixture was continuously supplied to a vertical reactor whose inside temperature was maintained at 240° C. and inside pressure at $1,333 \times 10^{-6}$ MPa and which was equipped with a fractionator and agitator at a rate of 60 kg/hr, $1 \times 10^{-6}$ equivalent of a bisphenol A disodium salt and $1 \times 10^{-4}$ equivalent of tetramethyl ammonium hydroxide were continuously added to 1 mol of 2,2-bis(4-hydroxyphenyl)propane, and a reaction was carried out by removing the produced phenol from the fractionator. The valve of the present invention shown in FIG. 6 was installed at the raw material inlet and the prepolymer outlet of this reactor. The obtained reaction mixture was continuously discharged using a gear pump. The polymerization degree of the obtained reaction mixture was obtained by measuring intrinsic viscosity thereof. As a result, a reaction mixture having a $[\eta]$ of 0.16 was obtained.

Thereafter, the reaction mixture was continuously supplied to a horizontal reactor whose inside temperature was maintained at 270° C. and inside pressure at $133 \times 10^{-6}$ MPa. The reaction mixture was further polymerized while the produced phenol was removed to the outside of the system to continuously produce a polycarbonate having a $[\eta]$ of 0.45. The viscosity of the reaction mixture at the outlet was 1, 400 Pa·S at 270° C.

A Y-shaped globe valve shown in FIG. 6 was installed at the reaction mixture inlet and the reaction mixture outlet of the horizontal reactor.

The specifications of the valve of the present invention used in this example were as follows.

The valve body was made from SCS14, stem from SUS316, disk from SUS316, seat from STELLITE FACE#6, and gland packing from T/#9075. The liquid contact portion of the valve had a pressure durability of 15 MPa, a heat durability of 300° C. and an ultimate vacuum of $1.33 \times 10^{-6}$ MPa ($3 \times 10^{-5}$ ACC/S or less according to a helium leak test). When the surface of the liquid contact portion was subjected to mechanical finishing (buff of #300), it had a surface roughness Rmax of 2.4 µm. A heating medium jacket was incorporated in the valve body to uniformly heat the valve. A disk was provided at the end of the stem. Flanges were used to connect the valve to a pipe.

When the reaction mixture was sampled at the outlet of the horizontal reactor after 16 days of continuous operation, dissolved in 1 kg of a methylene chloride solution and filtered with a 30 µm-mesh filter, about 65 foreign substances (in average) such as gels or thermally deteriorated products of the polycarbonate based on 1 kg of the polycarbonate were detected on the filter. There was a tendency toward an increase in the number of foreign substances as the operation time became longer.

Example 2

A polymerization reaction was carried out in the same manner as in Example 1 except that a Y-shaped globe valve shown in FIG. 8 was installed as the valve of the present invention.

The specifications of the valve were as follows.

The valve body was made from SCS14, stem from SUS316, seat from STELLITE FACE#6 and gland packing from T/#9075. An O ring of Kalrez was attached to the stem, and the liquid contact portion had a pressure durability of 15 MPa, a heat durability of 300° C. and an ultimate vacuum of $1.33 \times 10^{-6}$ MPa ($3 \times 10^{-5}$ ACC/S or less according to a helium leak test). When the surface of the liquid contact portion was subjected to mechanical finishing (buff of #300), it had a surface roughness Rmax of 2.4 µm. A heating medium jacket was incorporated in the valve body to uniformly heat the valve. A disk was not provided at the end of the stem, the diameter of the stem was made equal to that of a pipe, and the stem was welded to a pipe. A spacer having a smooth curved surface that does not disturb the flow of a polycarbonate resin was installed at the end of the stem.

When the reaction mixture was sampled at the outlet of the horizontal reactor after 16 days of operation, dissolved in 1 kg of methylene chloride and filtered with a 30 µm-mesh filter, about 3 foreign substances (in average) were existent on the filter based on 1 kg of the polycarbonate.

When the inner wall of the valve stem was observed with naked eye after 16 days of operation, it retained the same metal gloss as that before operation.

Example 3

A polymerization reaction was carried out in the same manner as in Example 1 except that an O ring of Kalrez was not attached to the stem of the same Y-shaped globe valve as in Example 2 installed as the valve of the present invention.

When the reaction mixture was sampled at the outlet of a horizontal reactor after 16 days of operation, dissolved in 1 kg of methylene chloride and filtered with a 30 µm-mesh filter, about 15 foreign substances (in average) were existent on the filter based on 1 kg of the polycarbonate.

Example 4

A polymerization reaction was carried out in the same manner as in Example 1 except that a spacer was not provided at the stem of the same Y-shaped globe valve as in Example 3 installed as the valve of the present invention.

When the reaction mixture was sampled at the outlet of a horizontal reactor after 16 days of operation, dissolved in 1 kg of methylene chloride and filtered with a 30 µm-mesh filter, about 25 foreign substances (in average) were existent on the filter based on 1 kg of the polycarbonate.

Comparative Example 1

A polymerization reaction was carried out in the same manner as in Example 1 except that a plug valve shown in FIG. 4 was used in place of the valve of the present invention.

The specifications of the valve were as follows.

The valve body was made from SCS14, plug from SUS316 and gland packing from T/#9075. The liquid contact portion had a pressure durability of 15 MPa and a heat durability of 300° C. The sliding portion of the valve was coated with Triballoy #400. When the surface of the liquid contact portion was finished with a buff of #100, it had a surface roughness Rmax of 15 µm.

When the reaction mixture was sampled at the outlet of a horizontal reactor after 16 days of operation, dissolved in 1 kg of methylene chloride and filtered with a 30 µm-mesh filter, about 100 foreign substances were existent on the filter based on 1 kg of the polycarbonate. There was a tendency toward an increase in the number of foreign substances as the operation time became longer.

Right after the valve was operated, countless foreign substances were existent on the filter. This phenomenon was not observed in any of the above Examples 1 to 4.

When the surface of the plug of the valve was observed with the naked eye after 16 days of operation, brown substances were adhered to the surface of the plug.

Comparative Example 2

A polymerization reaction was carried out in the same manner as in Example 1 except that a T-shaped globe valve shown in FIG. 5 was used in place of the valve of the present invention.

The specifications of the valve were as follows.

The valve body was made from SCS14, stem from SUS316, disk from SUS316, seat from STELLITE FACE#6 and gland packing from T/#9075. The liquid contact portion had a pressure durability of 15 MPa, a heat durability of 300° C. and an ultimate vacuum degree of $1.33 \times 10^{-6}$ MPa ($3 \times 10^{-5}$ ACC/S or less according to a helium leak test). When the surface of the liquid contact portion was finished with a buff of #100, it had a surface roughness Rmax of 15 $\mu$m. A heating medium jacket was incorporated in the valve body to uniformly heat the valve, and flanges were used to connect the valve to a pipe.

When the reaction mixture was sampled at the outlet of a horizontal reactor after 16 days of operation, dissolved in 1 kg of methylene chloride and filtered with a 30 $\mu$m-mesh filter, about 100 foreign substances were existent on the filter based on 1 kg of the polycarbonate. There was a tendency toward an increase in the number of foreign substances as the operation time became longer.

Right after the valve was operated, countless foreign substances were existent on the filter. This phenomenon was not observed in any of the above Examples 1 to 4.

When the rear surface of the disk of the valve was observed with the naked eye after 16 days of operation, brown substances were adhered to the surface.

Example 5

Diphenyl carbonate was charged into a dissolution tank equipped with a stirrer in an amount of 1.05 mols based on 1 mol of 2,2-bis(4-hydroxyphenyl)propane, the inside of the tank was substituted with nitrogen, 2,2-bis(4-hydroxyphenyl)propane was dissolved in diphenyl carbonate at 150° C., and the resulting mixture solution was transferred to a raw material storage tank maintained at 150° C.

Thereafter, the mixture was continuously supplied to a vertical reactor whose inside temperature was maintained at 240° C. and inside pressure at $1,333 \times 10^{-6}$ MPa and which was equipped with a fractionator and agitator at a rate of 60 kg/hr, $1 \times 10^{-6}$ equivalent of a bisphenol A disodium salt and $1 \times 10^{-4}$ equivalent of tetramethyl ammonium hydroxide were continuously added to 1 mol of 2,2-bis(4-hydroxyphenyl)propane, and a reaction was carried out by removing the produced phenol from the fractionator.

The obtained reaction mixture was continuously discharged using the gear pump of the present invention (to be referred to as "former gear pump"). The polymerization degree of the obtained reaction mixture was obtained by measuring intrinsic viscosity thereof. As a result, a reaction mixture having a [η] of 0.16 was obtained.

Thereafter, the reaction mixture was continuously supplied to a horizontal reactor whose inside temperature was maintained at 270° C. and inside pressure at $133 \times 10^{-6}$ MPa. The reaction mixture was further polymerized while the produced phenol was removed to the outside of the system to continuously produce a polycarbonate having a [η] of 0.35. The gear pump of the present invention (to be referred to as "latter gear pump") was used to discharged the obtained reaction mixture continuously. The viscosity of the reaction mixture at the outlet was 300 Pa·S at 270° C.

As for the gear pump of the present invention, the front plate, gear case and back plate were made from SUS420J2, the gear, bushing and shaft were made from SUS420J2 and had a surface roughness Rmax of 1.6 $\mu$m by buffing, and a hollow metal O ring was used to seal the fixed portion. The reaction mixture used to lubricate contact portions among the gear, shaft and other gear pump members was discharged to the outside of the pump without returning into the reaction mixture as final product, the flow passage of the reaction mixture had a restriction angle of 20° in terms of vertical angle, a gland packing was used as a shaft seal for the driving shaft of the former gear pump and a labyrinth seal was used as a shaft seal for the driving shaft of the latter gear pump.

Further, the size of the flow passage and the driving power of the gear pump were adjusted according to the viscosity of the reaction mixture. The size of the flow passage was adjusted because a pressure loss in the flow passage of the reaction mixture has a proportional relationship with viscosity ("the flow passage of the reaction mixture" is an item by which the diameters of the inlet and the outlet of the gear pump, the size of the lubricating groove in the gear and the clearance of the drive shaft seal were adjusted). The reason why the driving force of the gear pump was adjusted was that the required driving force of the gear pump was increased by a rise in the viscosity of the reaction mixture.

When 1 kg of the polymer obtained at the outlet of the horizontal reactor was sampled after 10 days of operation, dissolved in methylene chloride and filtered with a 30 $\mu$m-mesh filter, about 8 foreign substances (in average) were detected on the filter based on 1 kg of the polycarbonate. The expression "foreign substances" as used herein means a gel, highly crystallized product and thermally deteriorated product of a polycarbonate.

When the gear pump was disassembled after 40 days of operation, a deteriorated reaction mixture was adhered between the cover plate and the bushing and to end portions of the driving shaft and the follow shaft. The other liquid contact portions of the reaction mixture retained almost the same metal gloss as that before operation.

Example 6

A polymerization reaction was carried out in the same manner as in Example 5 except that the bushing for supporting the shaft of the gear was fixed to the cover plate, a gap between the cover plate and the bushing was substantially eliminated, and a scraper was installed at end portions of the driving shaft and the follow shaft.

When 1 kg of the polymer obtained at the outlet of a horizontal reactor after 10 days of operation, dissolved in methylene chloride and filtered with a 30 $\mu$m-mesh filter, about 2 foreign substances (in average) were detected on the filter based on 1 kg of the polycarbonate.

When the gear pump was disassembled after 40 days of operation, the liquid contact portion of the reaction mixture retained almost the same metal gloss as that before operation.

Comparative Example 3

A polymerization reaction was carried out in the same manner as in Example 5 except that the gear pump used was such that the front plate, gear case and back plate were made from SUS316, a reaction mixture used to lubricate contact portions among the gear, shaft and other gear pump members returned into the reaction mixture as final product after lubrication, the bushing for supporting the shaft of the gear was not fixed to the cover plate, there was no scraper at the end portion of the shaft, the restriction angle of the flow passage of the reaction mixture was 60° in terms of vertical angle, a mechanical seal was used for the former gear pump as a drive shaft seal, there was a level difference in the flow passage at the inlet of the reaction mixture formed by chamfering 4 mm, the surface roughness of the liquid contact portion was set to Rmax of 12.5 μm, and the sealing of the fixed portion is metal-to-metal sealing.

When 1 kg of the polymer obtained at the outlet of a horizontal reactor was sampled after 10 days of operation, dissolved in methylene chloride and filtered with a 30 μm filter, about 90 foreign substances (in average) were detected on the filter based on 1 kg of the polycarbonate. There was a tendency toward an increase in the number of foreign substances as the operation time became longer.

When the gear pump was disassembled after 40 days of operation, a reaction mixture which was discolored in the flow passage of the reaction mixture used to lubricate contact portions among the gear, shaft and other gear pump members was adhered to end portions of the gear shaft, and a discolored reaction mixture resided in the gap between the cover plate and the bushing. The shaft end portion showed the marks of a deteriorated reaction mixture adhered thereto. The mechanical seal as a drive shaft seal for the former gear pump showed the marks of a sealing solution leaking inside. A discolored reaction mixture was also adhered to a level difference portion of the flow passage of the reaction mixture and small recessed portions in the flow passage of the polycarbonate.

Comparative Example 4

A polymerization reaction was carried out in the same manner as in Example 5 except that the gear pump used was made from SKD11, the reaction mixture used to lubricate contact portions among the gear, shaft and other gear pump members returned into the reaction mixture as final product again after lubrication, the bushing for supporting the shaft of the gear was not fixed to the cover plate, there was no scraper at the end portion of the shaft, the restriction angle of the flow passage of the reaction mixture was 60° in terms of vertical angle, the drive shaft seal was a gland packing, there was a level difference formed by chamfering 4 mm in the flow passage at the inlet of the reaction mixture, the surface roughness of the liquid contact portion was set to 12.5 μm, the sealing of the fixed portion was metal-to-metal sealing.

When 1 kg of the polymer obtained at the outlet of a horizontal reactor was sampled after 10 days of operation, dissolved in methylene chloride and filtered with a 30 μm filter, about 200 foreign substances were detected on the filter based on 1 kg of the polycarbonate. When the obtained reaction mixture was observed with the naked eye, it assumed a brown color.

When the gear pump was disassembled after 40 days of operation, a discolored reaction mixture was adhered to the whole flow passage of the reaction mixture. A discolored reaction mixture was adhered to the inside of the flow passage of the reaction mixture used to lubricate contact portions among the gear, shaft and other gear pump members, and the discolored reaction mixture resided in the gap between the cover plate and the bushing. The shaft end portion showed the marks of the deteriorated reaction mixture adhered thereto.

Example 7

Diphenyl carbonate was charged into a dissolution tank equipped with a stirrer in an amount of 1.05 mols based on 1 mol of 2,2-bis(4-hydroxyphenyl)propane, the inside of the tank was substituted with nitrogen, 2,2-bis(4-hydroxyphenyl)propane was dissolved in diphenyl carbonate at 150° C., and the resulting mixture solution was transferred to a raw material storage tank maintained at 150° C.

Thereafter, the mixture was continuously supplied to a vertical reactor whose inside temperature was maintained at 240° C. and inside pressure at $1,333 \times 10^{-6}$ MPa and which was equipped with a fractionator and agitator by a pump connected with flanges at a rate of 60 kg/hr, $1 \times 10^{-6}$ equivalent of a bisphenol A disodium salt and $1 \times 10^{-4}$ equivalent of tetramethyl ammonium hydroxide were continuously added to 1 mol of 2,2-bis(4-hydroxyphenyl)propane, and a reaction was carried out by removing the produced phenol from the fractionator. The obtained reaction mixture was continuously discharged using a gear pump from the pipe connected with the flanges of the present invention. The polymerization degree of the obtained reaction mixture was obtained by measuring intrinsic viscosity thereof. As a result, a reaction mixture having a [η] of 0.16 was obtained.

Thereafter, the reaction mixture was continuously supplied to a horizontal reactor whose inside temperature was maintained at 270° C. and inside pressure at $133 \times 10^{-6}$ MPa.

The reaction mixture was further polymerized while the produced phenol was removed to the outside of the system to continuously produce a polycarbonate having a [η] of 0.35.

The flange for the object of this example was used to connect connection pipes for the horizontal reactor, the connection pipes for the horizontal reactor to the horizontal reactor, the horizontal reactor to the outlet pipe thereof, and the outlet pipes for the horizontal reactor.

The viscosity of the reaction mixture on the outlet side was 300 Pa·S.

Figure 15:
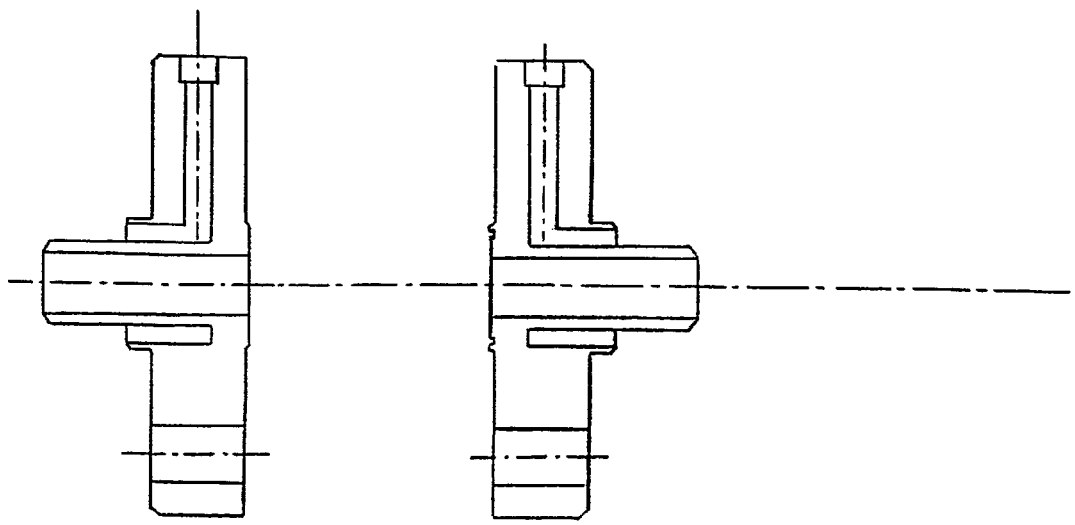
FIG. 15 is a sectional view of an example of a flange according to the present invention.

The flange used to attain the object of this example was a flange incorporating a heating medium jacket as shown in FIG. 15 and made from SUS316, the reaction mixture contact surface and the pipe and socket metal-to-metal sealing surfaces thereof had a surface roughness of 1.6 μm in terms of Rmax, and TIG welding was used. A hollow metal O ring prepared by plating SUS316 with silver was used for a gasket and the gasket was tightened with predetermined torque and tightened more strongly by elevating temperature.

This flange has a heat durability of 300° C. or more, substantially no leakage under a vacuum pressure of $40,000 \times 10^{-6}$ MPa or less and a pressure durability of 15 MPa.

The flange shown in FIG. 15 differs from the flange shown in FIG. 14 in that there is no groove portion (male) 207 and no groove potion (female) 208 and the heating medium jacket shown in FIG. 14 does not extend to the collar potion of the flange.

When 1 kg of the polymer obtained at the outlet of the horizontal reactor was sampled after 10 days of operation, dissolved in methylene chloride and filtered with a 30 μm filter, about 15 foreign substances (in average) were detected on the filter based on 1 kg of the polycarbonate. The expression "foreign substances" as used herein means a gel, highly crystallized product and thermally deteriorated product of a polycarbonate.

When the flange was disassembled after 30 days of operation, the reaction mixture contact portion had the same metal gloss as that before operation and a slight amount of a deteriorated product of the polycarbonate resin was adhered to the metal-to-metal sealing surface.

Example 8

A polymerization reaction was carried out in the same manner as in Example 7 except that the flange shown in FIG. 14 was used in place of the flange shown in FIG. 15.

When 1 kg of the polymer obtained at the outlet of the horizontal reactor was sampled after 10 days of operation, dissolved in methylene chloride and filtered with a 30 $\mu$m filter, about 2 foreign substances (in average) were detected on the filter based on 1 kg of the polycarbonate.

When the flange was disassembled after 30 days of operation, the reaction mixture contact portion had the same metal gloss as that before operation and the metal-to-matel sealing surface had the same metal gloss as that before operation as well.

Comparative Example 5

A polymerization reaction was carried out in the same manner as in Example 7 except that a flange of the same type as that shown in FIG. 15 which had no metal O ring attachment portion and no heating medium jacket was used in place of the flange shown in FIG. 15 and an asbestos spiral wound gasket provided with inner and outer rings was used.

When 1 kg of the polymer obtained at the outlet of the horizontal reactor was sampled after 10 days of operation, dissolved in methylene chloride and filtered with a 30 $\mu$m filter, about 55 almost white foreign substances (in average) were detected on the filter based on 1 kg of the polycarbonate.

When the flange was disassembled after 16 days of operation, white foreign substances were adhered to the reaction mixture contact portion in large quantities and a deteriorated product of the polycarbonate resin was adhered to the metal-to-metal sealing surface.

Example 9

Diphenyl carbonate was charged into a dissolution tank equipped with a stirrer in an amount of 1.05 mols based on 1 mol of 2,2-bis(4-hydroxyphenyl)propane, the inside of the tank was substituted with nitrogen, 2,2-bis(4-hydroxyphenyl)propane was dissolved in diphenyl carbonate at 150° C., and the resulting mixture solution was transferred to a raw material storage tank maintained at 150° C.

Thereafter, the mixture was continuously supplied to a vertical reactor whose inside temperature was maintained at 240° C. and inside pressure at $1,333 \times 10^{-6}$ MPa and which was equipped with a fractionator and agitator at a rate of 60 kg/hr, $1 \times 10^{-6}$ equivalent of a bisphenol A disodium salt and $1 \times 10^{-4}$ equivalent of tetramethyl ammonium hydroxide were continuously added to 1 mol of 2,2-bis(4-hydroxyphenyl)propane, and a reaction was carried out by removing the produced phenol from the fractionator.

The obtained reaction mixture was continuously discharged using a gear pump. The polymerization degree of the obtained reaction mixture was obtained by measuring intrinsic viscosity thereof. As a result, a reaction mixture having a [η] of 0.16 was obtained.

Thereafter, the reaction mixture was continuously supplied to a horizontal reactor whose inside temperature was maintained at 270° C. and inside pressure at $133 \times 10^{-6}$ MPa. The reaction mixture was further polymerized while the produced phenol was removed to the outside of the system to continuously produce a polycarbonate having a [η] of 0.35.

The obtained reaction mixture was continuously discharged using a gear pump. The viscosity of the reaction mixture at the outlet was 300 Pa·S at 270° C.

The reducer of the present invention was used in all the restricted and expanded portions of the pipes used to connect the dissolution tank to the vertical reactor, gear pump, horizontal reactor and gear pump for the discharge of a reaction mixture and all the branches of the pipes.

The used pipes and the reducer of the present invention were made from SUS316 and had a surface roughness of 1.6 $\mu$m in terms of Rmax by buffing, and a reducer of an eccentric type having a restriction or expansion angle of 10° in terms of vertical angle was connected to the pipe by TIG welding in such a manner that an upper portion of the reducer became horizontal.

When 1 kg of the polymer obtained at the outlet of the horizontal reactor was sampled after 10 days of operation, dissolved in methylene chloride and filtered with a 30 $\mu$m-mesh filter, about 2 foreign substances (in average) were detected on the filter based on 1 kg of the polycarbonate. The expression "foreign substances" as used herein means a gel, highly crystallized product and thermally deteriorated product of a polycarbonate.

When the liquid contact portion of the reducer was observed through a fiberscope after 40 days of operation, it retained almost the same metal gloss as that before operation. However, when the restricted and expanded portions of the liquid contact portions of the gear pump and the valve used were dissembled and inspected, a trace amount of a brown product was adhered.

Example 10

A polymerization reaction was carried out in the same manner as in Example 9 except that the restriction and expansion of the liquid contact portions of the gear pump and the valve used were set to a vertical angle of 20°.

When 1 kg of the polymer obtained at the outlet of the horizontal reactor was sampled after 10 days of operation, dissolved in methylene chloride and filtered with a 30 $\mu$m-mesh filter, about 8 foreign substances (in average) were detected on the filter based on 1 kg of the polycarbonate.

When the liquid contact surfaces of the gear pump and the valve were observed through a fiberscope after 40 days of operation, they retained almost the same metal gloss as that before operation.

Comparative Example 6

A polymerization reaction was carried out in the same manner as in Example 9 except that a reducer of a concentric type having a restriction and expansion angle of 45° in terms of vertical angle was used.

When 1 kg of the polymer obtained at the outlet of the horizontal reactor was sampled after 10 days of operation, dissolved in methylene chloride and filtered with a 30 $\mu$m-mesh filter, about 15 foreign substances (in average) were detected on the filter based on 1 kg of the polycarbonate. There was a tendency toward an increase in the number of the foreign substances as the operation time became longer.

When the reducer was observed through a fiberscope after 40 days of operation, a slight amount of a brown product was adhered to the liquid contact surface of the reducer. A larger amount of the brown product was adhered to an upper portion of the liquid contact surface of the reducer than a lower portion of the liquid contact surface, and a larger amount of the brown product was adhered to the expanded portion than the restricted portion.

Example 11

Diphenyl carbonate was charged into a dissolution tank equipped with a stirrer in an amount of 1.05 mols based on 1 mol of 2,2-bis(4-hydroxyphenyl)propane, the inside of the tank was substituted with nitrogen, 2,2-bis(4-hydroxyphenyl)propane was dissolved in diphenyl carbonate at 150° C., and the resulting mixture solution was transferred to a raw material storage tank maintained at 150° C.

Thereafter, the mixture was continuously supplied to a vertical reactor whose inside temperature was maintained at 240° C. and inside pressure at $1,333 \times 10^{-6}$ MPa and which was equipped with a fractionator and agitator at a rate of 60 kg/hr, $1 \times 10^{-6}$ equivalent of a bisphenol A disodium salt and $1 \times 10^{-4}$ equivalent of tetramethyl ammonium hydroxide were continuously added to 1 mol of 2,2-bis(4-hydroxyphenyl)propane, and a reaction was carried out by removing the produced phenol from the fractionator.

The obtained reaction mixture was continuously discharged using a gear pump. The polymerization degree of the obtained reaction mixture was obtained by measuring intrinsic viscosity thereof. As a result, a reaction mixture having a $[\eta]$ of 0.16 was obtained.

Thereafter, the reaction mixture was continuously supplied to a horizontal reactor whose inside temperature was maintained at 270° C. and inside pressure at $133 \times 10^{-6}$ MPa. The reaction mixture was further polymerized while the produced phenol was removed to the outside of the system to continuously produce a polycarbonate having a $[\eta]$ of 0.35. The viscosity of the reaction mixture at the outlet was 300 Pa·S at 270° C.

The pipe and curved portion of the present invention used were cold bent with a bender, made from SUS316 and finished by fluid polishing and buffing to a surface roughness of 1.6 μm in terms of Rmax. The curvature of the pipe was 9 times the inner diameter of the pipe. The pipe was connected by TIG welding.

In this example, the curved portion of the present invention was used for all the curved portions of pipes used to connect the dissolution tank to the vertical reactor, gear pump, horizontal reactor and gear pump for the extraction of a polycarbonate and in all branches of these pipes for the transfer of the reaction mixture.

When 1 kg of the polymer obtained at the outlet of the horizontal reactor was sampled after 10 days of operation, dissolved in methylene chloride and filtered with a 30 μm-mesh filter, about 2 foreign substances (in average) were detected on the filter based on 1 kg of the polycarbonate. The expression "foreign substances" as used herein means a gel, highly crystallized product and thermally deteriorated product of a polycarbonate.

When the inside of the pipe was observed through a fiberscope after 40 days of operation, the reaction mixture contact portion retained almost the same metal gloss as that before operation.

Comparative Example 7

A polymerization reaction was carried out in the same manner as in Example 11 except that an elbow pipe specified by JIS B 2312-1986 was used as a pipe having a curved portion.

When 1 kg of the polymer obtained at the outlet of the horizontal reactor was sampled after 10 days of operation, dissolved in methylene chloride and filtered with a 30 μm-mesh filter, about 15 foreign substances (in average) were detected on the filter based on 1 kg of the polycarbonate. There was a tendency toward an increase in the number of the foreign substances as the operation time became longer.

When the inside of the elbow was observed through a fiberscope after 40 days of operation, a slight amount of a brown product was adhered to the liquid contact surface of the elbow.

Example 12

Diphenyl carbonate was charged into a dissolution tank equipped with a stirrer in an amount of 1.05 mols based on 1 mol of 2,2-bis(4-hydroxyphenyl)propane, the inside of the tank was substituted with nitrogen, 2,2-bis(4-hydroxyphenyl)propane was dissolved in diphenyl carbonate at 150° C., and the resulting mixture solution was transferred to a raw material storage tank maintained at 150° C.

Thereafter, the mixture was continuously supplied to a vertical reactor whose inside temperature was maintained at 240° C. and inside pressure at $1,333 \times 10^{-6}$ MPa and which was equipped with a fractionator and agitator at a rate of 60 kg/hr, $1 \times 10^{-6}$ equivalent of a bisphenol A disodium salt and $1 \times 10^{-4}$ equivalent of tetramethyl ammonium hydroxide were continuously added to 1 mol of 2,2-bis(4-hydroxyphenyl)propane, and a reaction was carried out by removing the produced phenol from the fractionator.

The obtained reaction product was continuously discharged using a gear pump. The polymerization degree of the obtained reaction product was obtained by measuring intrinsic viscosity thereof. As a result, a reaction mixture having a $[\eta]$ of 0.16 was obtained.

Thereafter, the reaction mixture was continuously supplied to a horizontal reactor whose inside temperature was maintained at 270° C. and inside pressure at $133 \times 10^{-6}$ MPa. The reaction mixture was further polymerized while the produced phenol was removed to the outside of the system to continuously produce a polycarbonate having a $[\eta]$ of 0.35. The obtained reaction mixture was continuously discharged using a gear pump and the reducer of the present invention. The viscosity of the reaction mixture at the outlet was 300 Pa·S at 270° C.

In this example, the flange, reducer, bender bent pipe, valve and gear pump of the present invention were used for all the flanges, the restricted, expanded and curved portions of the pipes and the valves as transfer members and branch pipes provided for these transfer members installed in a production line from the dissolution tank, vertical reactor, gear pump, horizontal reactor and gear pump for the discharge of a polycarbonate as shown in FIG. 1.

The transfer members of the present invention have a heat durability of 300° C., substantially no leakage under a vacuum pressure of $40,000 \times 10^{-6}$ MPa or less and a pressure resistance of 15 MPa.

As for the materials of the liquid contact portions of the transfer members used, the gear pump was made from SUS420J2 and other members were made from SUS316. A hollow metal O ring prepared by plating SUS316 with silver was used for a gasket and the gasket was tightened with predetermined torque and tightened more strongly by elevating temperature.

All the transfer members of the present invention were kept warm by a heating medium jacket to prevent the temperature of the reaction mixture from being lowered than the temperature of each reactor. The liquid contact portions had a surface roughness of 1.6 μm in terms of Rmax by fluid polishing or buffing and were made smooth with substantially no level differences, and the metal-touch surface of each of the transfer members had a surface roughness of 1.6 μm in terms of Rmax. TIG welding was used for welded portions.

All the flow passages of the present invention except the inlet portion of the gear pump which had a restriction or expansion angle of 20° in terms of vertical angle had a vertical angle of 10° and were cold bent to ensure that the curvature became 9 times the inner diameter of the flow passage.

The reducer used in the pipe portions was an eccentric type reducer shown in FIG. 20 which was installed in such a manner that an upper portion thereof became horizontal.

The flange of the present invention incorporated a heating medium jacket as shown in FIG. 14.

The gear pump of the present invention discharged the reaction mixture used to lubricate contact portions among the gear, shaft and other gear pump members to the outside of the pump so that it did not return into the reaction mixture as a final product again. A gland packing was used as a seal for the drive shaft of the former gear pump and a labyrinth seal was used as a seal for the driving shaft of the latter gear pump.

The delivery pressure of the former gear pump was adjusted to 1 MPa and the delivery pressure of the latter gear pump was adjusted to 3 MPa.

The bushing for supporting the shaft of the gear was fixed to the cover plate, a gap between the cover plate and the bushing was substantially eliminated, and a scraper was installed at end portions of the driving shaft and the follow shaft.

The valve of the present invention is a Y-shaped globe valve shown in FIG. 8, the diameter of the stem was made substantially equal to the inner diameter of the pipe, and a spacer having a smooth curved surface that did not disturb the flow of the reaction mixture was installed at an end portion of the stem. The seat was made from STELLITE FACE #6.

When 1 kg of the polymer was sampled at the outlet of the horizontal reactor after 10 days of operation, dissolved in methylene chloride and filtered with a 30 μm-mesh filter, about 1 foreign substances (in average) were detected on the filter based on 1 kg of the polycarbonate. The expression "foreign substances" as used herein means a gel, highly crystallized product and thermally deteriorated product of a polycarbonate. When the number of foreign substances were counted likewise for 90 days of operation, it remained the same at about 1 based on 1 kg of the polycarbonate. When the mixture of foreign substances at the time of sampling was taken into consideration, it was estimated that there was substantially no foreign substance which was formed during the production of the polycarbonate.

When the transfer members were observed through a fiberscope after 90 days of operation, the liquid contact portions of the reaction mixture maintained almost the same metal gloss as that before operation.

Example 13

A polymerization reaction was carried out in the same manner as in Example 12 except that a flange shown in FIG. 15 which had no metal O ring attachment portion and no heating medium jacket was used in place of the flange used in a production line from the former gear pump to the polycarbonate discharge portion and an asbestos spiral wound gasket provided with inner and outer rings was used.

When 1 kg of the polymer was sampled at the outlet of the horizontal reactor after 10 days of operation, dissolved in methylene chloride and filtered with a 30 μm-mesh filter, 5 to 10 foreign substances were detected on the filter based on 1 kg of the polycarbonate.

When the transfer members were observed through a fiberscope after 16 days of operation, the liquid contact portions of the reaction mixture excluding the flange portions maintained almost the same metal gloss as that before operation. White foreign matter was adhered to the liquid contact portions of the flange portions in large quantities and a brown deteriorated product was adhered to the gasket between the flanges.

Example 14

A polymerization reaction was carried out in the same manner as in Example 12 except that a gear pump in which the front plate, gear case and back plate were made from SUS316, the reaction mixture used to lubricate contact portions among the gear, shaft and other gear pump members returned into the reaction mixture which would become a product after lubrication again, the bushing for supporting the shaft of the gear was not fixed to the cover plate, there was no scraper at end portions of the shafts, the restriction angle of the flow passage at the inlet of the gear pump was 60° in terms of vertical angle, a mechanical seal was used for the former gear pump, the liquid contact portions had a surface roughness of 12.5 μm in terms of Rmax, and the sealing of the fixed portion was metal-to-metal sealing was used in place of the gear pump of the present invention.

When 1 kg of the polymer was sampled at the outlet of the horizontal reactor after 10 days of operation, dissolved in methylene chloride and filtered with a 30 μm-mesh filter, about 40 foreign substances (in average) were detected on the filter based on 1 kg of the polycarbonate.

When the transfer members were observed through a fiberscope after 16 days of operation, the liquid contact portions of the reaction mixture excluding the gear pump portions maintained almost the same metal gloss as that before operation. When the gear pump was disassembled and inspected, a discolored reaction mixture used to lubricate contact portions among the gear, shaft and other gear pump members was adhered to the inside of the flow passages, and a brown deteriorated product was adhered between the cover plate and the bushing. The shaft end portion showed the marks of a brown product adhered thereto. The mechanical seal as a drive shaft seal for the former gear pump showed the marks of a sealing solution leaking inside and mixed into the reaction mixture.

Example 15

A polymerization reaction was carried out in the same manner as in Example 12 except that a T-shaped globe valve shown in FIG. 5 was used as a valve between a vertical reactor and a horizontal reactor in place of the valve of the present invention.

When 1 kg of the polymer was sampled at the outlet of the horizontal reactor after 10 days of operation, dissolved in methylene chloride and filtered with a 30 μm-mesh filter, about 50 foreign substances (in average) were detected on the filter based on 1 kg of the polycarbonate. Countless foreign substances were existent on the filter right after the valve was operated.

A required amount of the reaction mixture could not be supplied unless the delivery pressure of the former gear pump was raised to 1.2 MPa.

When the transfer members were observed through a fiberscope after 16 days of operation, the liquid contact portions of the reaction mixture excluding the valve portions maintained almost the same metal gloss as that before operation. However, when the valve was disassembled and inspected, white and brown products were adhered to the rear side of the disk of the valve and a residence portion formed in the rear side of the disk of the valve in large quantities. A brown product was partially adhered to a location where the flow of the valve sharply changed.

In the industrial process for producing a polycarbonate by melt polymerization, the retention of the reaction mixture is suppressed, the formation of a deteriorated product of the polymer is minimized, and a high-quality polycarbonate can be obtained as a base material for optical recording media by using (1) valves, (2) gear pumps, (3) flanges and (4) flow passages having specific structures and characteristic properties.

What is claimed is:

1. A process for producing a polycarbonate resin through the melt polycondensation of an aromatic diol compound and a carbonic acid diester compound, wherein (1) valves, (2) pumps, (3) flanges and (4) flow passages having the following structures and characteristic properties are used in the production process:

(1) valve; Y-shaped globe valve which has a heat durability of 150° C. or more, substantially no leakage under a vacuum pressure of $40,000 \times 10^{-6}$ MPa or less and a pressure durability of 0.1 MPa or more, and whose liquid contact portion is made from a material having corrosion resistance against a monohydroxy compound formed by a reaction between the aromatic diol compound and the carbonic acid diester compound;

(2) gear pump; gear pump which has a heat durability of 150° C. or more, substantially no leakage under a vacuum pressure of $40,000 \times 10^{-6}$ MPa, a pressure durability of 0.1 MPa or more and a delivery pressure of 1 MPa or more, whose liquid contact portion is made from a material having corrosion resistance against a monohydroxy compound formed by a reaction between the aromatic diol compound and the carbonic acid diester compound, and which has such a structure that the reaction mixture under a vacuum pressure of $40,000 \times 10^{-6}$ MPa or less can be discharged and that the reaction mixture for lubricating contact portions among a gear, shaft and other gear pump members does not return into the pump and is discharged to the outside of the pump;

(3) flange; flange which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, and which has a heating medium jacket therein; and (4) flow passage; flow passage which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, which is restricted and/or expanded at a vertical angle of 20° or less, and whose surface is smooth without level differences, wherein substantially no leakage means that the leakage of gas from the outside of the valve, the gear pump, the flange or the flow passage is $120 \times 10^{-6}$ MPa/h or less based on 1 liter of the inner capacity when the ultimate vacuum degree is $13.3 \times 10^{-6}$ MPa.

2. A process for producing a polycarbonate resin through the melt polycondensation of an aromatic diol compound and a carbonic acid diester compound, wherein (1) valves, (2) gear pumps and (3) flanges having the following structures and characteristic properties are used in the production process:

(1) valve; Y-shaped globe valve which has a heat durability of 150° C. or more, substantially no leakage under a vacuum pressure of $40,000 \times 10^{-6}$ MPa or less and a pressure durability of 0.1 MPa or more, and whose liquid contact portion is made from a material having corrosion resistance against a monohydroxy compound formed by a reaction between the aromatic diol compound and the carbonic acid diester compound;

(2) gear pump; gear pump which has a heat durability of 150° C. or more, substantially no leakage under a vacuum pressure of $40,000 \times 10^{-6}$ MPa, a pressure durability of 0.1 MPa or more and a delivery pressure of 1 MPa or more, whose liquid contact portion is made from a material having corrosion resistance against a monohydroxy compound formed by a reaction between the aromatic diol compound and the carbonic acid diester compound, and which has such a structure that the reaction mixture under a vacuum pressure of $40,000 \times 10^{-6}$ MPa or less can be discharged and that the reaction mixture for lubricating contact portions among a gear, shaft and other gear pump members does not return into the pump and is discharged to the outside of the pump; and (3) flange; flange which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, and which has a heating medium jacket therein, wherein substantially no leakage means that the leakage of gas from the outside of the valve, the gear pump, the flange or the flow passage is $120 \times 10^{-6}$ MPa/h or less based on 1 liter of the inner capacity when the ultimate vacuum degree is $13.3 \times 10^{-6}$ MPa.

3. A process for producing a polycarbonate resin through the melt polycondensation of an aromatic diol compound and a carbonic acid diester compound, wherein at least two members out of (1) valves, (2) gear pumps and (3) flanges used in the production process have the following structures and characteristic properties:

(1) valve; Y-shaped globe valve which has a heat durability of 150° C. or more, substantially no leakage under a vacuum pressure of $40,000 \times 10^{-6}$ MPa or less and a pressure durability of 0.1 MPa or more, and whose liquid contact portion is made from a material having corrosion resistance against a monohydroxy compound formed by a reaction between the aromatic diol compound and the carbonic acid diester compound;

(2) gear pump; gear pump which has a heat durability of 150° C. or more, substantially no leakage under a vacuum pressure of $40,000 \times 10^{-6}$ MPa, a pressure durability of 0.1 MPa or more and a delivery pressure of 1 MPa or more, whose liquid contact portion is made from a material having corrosion resistance against a monohydroxy compound formed by a reaction between the aromatic diol compound and the carbonic acid diester compound, and which has such a structure that the reaction mixture under a vacuum pressure of $40,000 \times 10^{-6}$ MPa or less can be discharged and that the reaction mixture for lubricating contact portions among a gear, shaft and other gear pump members does not return into the pump and is discharged to the outside of the pump; and (3) flange; flange which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, and which has a heating medium jacket therein, wherein substantially no leakage means that the leakage of gas from the outside of the valve, the gear pump, the flange or the flow passage is $120 \times 10^{-6}$ MPa/h or less based on 1 liter of the inner capacity when the ultimate vacuum degree is $13.3 \times 10^{-6}$ MPa.

4. The polycarbonate resin production process according to claim 3, wherein flow passages (4) having the following structure and characteristic properties are used:

(4) flow passage; flow passage which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, which is restricted and/or expanded at a vertical angle of 20° or less, and whose surface is smooth without level differences, wherein substantially no leakage means that the leakage of gas from the outside of the valve, the gear pump, the flange or the flow passage is $120 \times 10^{-6}$ MPa/h or less based on 1 liter of the inner capacity when the ultimate vacuum degree is $13.3 \times 10^{-6}$ MPa.

5. A process for producing a polycarbonate resin through the melt polycondensation of an aromatic diol compound and a carbonic acid diester compound, wherein at least one member out of (1) valves, (2) gear pumps and (3) flanges used in the production process has the following structure and characteristic properties:

(1) valve; Y-shaped globe valve which has a heat durability of 150° C. or more, substantially no leakage under a vacuum pressure of $40,000 \times 10^{-6}$ MPa or less and a pressure durability of 0.1 MPa or more, and whose liquid contact portion is made from a material having corrosion resistance against a monohydroxy compound formed by a reaction between the aromatic diol compound and the carbonic acid diester compound;

(2) gear pump; gear pump which has a heat durability of 150° C. or more, substantially no leakage under a vacuum pressure of $40,000 \times 10^{-6}$ MPa, a pressure durability of 0.1 MPa or more and a delivery pressure of 1 MPa or more, whose liquid contact portion is made from a material having corrosion resistance against a monohydroxy compound formed by a reaction between the aromatic diol compound and the carbonic acid diester compound, and which has such a structure that the reaction mixture under a vacuum pressure of $40,000 \times 10^{-6}$ MPa or less can be discharged and that the reaction mixture for lubricating contact portions among a gear, shaft and other gear pump members does not return into the pump and is discharged to the outside of the pump; and (3) flange; flange which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, and which has a heating medium jacket therein, wherein substantially no leakage means that the leakage of gas from the outside of the valve, the gear pump, the flange or the flow passage is $120 \times 10^{-6}$ MPa/h or less based on 1 liter of the inner capacity when the ultimate vacuum degree is $13.3 \times 10^{-6}$ MPa.

6. The polycarbonate resin production process according to claim 5, wherein flow passages (4) having the following structure and characteristic properties are used:

(4) flow passage; flow passage which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, which is restricted and/or expanded at a vertical angle of 20° or less, and whose surface is smooth without level differences.

7. A process for producing a polycarbonate resin through the melt polycondensation of an aromatic diol compound and a carbonic acid diester compound, wherein at least one member out of (1) valves, (2) gear pumps, (3) flanges and (4) flow passages used in the production process has the following structure and characteristic properties:

(1) valve; Y-shaped globe valve which has a heat durability of 150° C. or more, substantially no leakage under a vacuum pressure of $40,000 \times 10^{-6}$ MPa or less and a pressure durability of 0.1 MPa or more, and whose liquid contact portion is made from a material having corrosion resistance against a monohydroxy compound formed by a reaction between the aromatic diol compound and the carbonic acid diester compound;

(2) gear pump; gear pump which has a heat durability of 150° C. or more, substantially no leakage under a vacuum pressure of $40,000 \times 10^{-6}$ MPa, a pressure durability of 0.1 MPa or more and a delivery pressure of 1 MPa or more, whose liquid contact portion is made from a material having corrosion resistance against a monohydroxy compound formed by a reaction between the aromatic diol compound and the carbonic acid diester compound, and which has such a structure that the reaction mixture under a vacuum pressure of 40,000×10⁻⁶ MPa or less can be discharged and that the reaction mixture for lubricating contact portions among a gear, shaft and other gear pump members does not return into the pump and is discharged to the outside of the pump;

(3) flange; flange which has a heat durability of 150° C. or more, substantially no leakage under a vacuum pressure of 40,000×10⁻⁶ MPa or less and a pressure durability of 0.1 MPa or more, whose liquid contact portion is made from a material having corrosion resistance against a monohydroxy compound formed by a reaction between the aromatic diol compound and the carbonic acid diester compound, and which has a heating medium jacket therein; and (4) flow passage; flow passage which has a heat durability of 150° C. or more, substantially no leakage under a vacuum pressure of 40,000×10⁻⁶ MPa or less and a pressure durability of 0.1 MPa or more, whose liquid contact portion is made from a material having corrosion resistance against a monohydroxy compound formed by a reaction between the aromatic diol compound and the carbonic acid diester compound, which is restricted and/or expanded at an vertical angle of 20° or less, and whose surface is smooth without level differences, wherein substantially no leakage means that the leakage of gas from the outside of the valve, the gear pump, the flange or the flow passage is 120×10⁻⁶ MPa/h or less based on 1 liter of the inner capacity when the ultimate vacuum degree is 13.3×10⁻⁶ MPa.

8. A process for producing a polycarbonate resin through the melt polycondensation of an aromatic diol compound and a carbonic acid diester compound, wherein (1) valves having the following structure and characteristic properties are used in the production process:

(1) valve; Y-shaped globe valve which has a heat durability of 150° C. or more, substantially no leakage under a vacuum pressure of 40,000×10⁻⁶ MPa or less and a pressure durability of 0.1 MPa or more, and whose liquid contact portion is made from a material having corrosion resistance against a monohydroxy compound formed by a reaction between the aromatic diol compound and the carbonic acid diester compound, wherein substantially no leakage means that the leakage of gas from the outside of the valve, the gear pump, the flange or the flow passage is 120×10⁻⁶ MPa/h or less based on 1 liter of the inner capacity when the ultimate vacuum degree is 13.3×10⁻⁶ MPa.

9. The polycarbonate production process according to claim 8, wherein the stem of the Y-shaped globe valve has substantially the same thickness as that of a portion into which the stem is inserted of a valve body.

10. The polycarbonate production process according to claim 8 or 9, wherein an end portion of the stem of the Y-shaped globe valve and the inner surface of an upper tubular portion of the valve form a smooth curved surface when the valve is opened.

11. The polycarbonate production process according to any one of claims 8 to 10, wherein an O ring is attached to the stem of the Y-shaped globe valve to seal a gap between the stem and the portion into which the stem is inserted of the valve body.

12. The polycarbonate production process according to any one of claims 8 to 11, wherein the liquid contact portion of the Y-shaped globe valve has a surface roughness of 10 μm or less.

13. A process for producing a polycarbonate resin through the melt polycondensation of an aromatic diol compound and a carbonic acid diester compound, wherein (2) gear pumps having the following structure and characteristic properties are used in the production process:

(2) gear pump; gear pump which has a heat durability of 150° C. or more, substantially no leakage under a vacuum pressure of 40,000×10⁻⁶ MPa, a pressure durability of 0.1 MPa or more and a delivery pressure of 1 MPa or more, whose liquid contact portion is made from a material having corrosion resistance against a monohydroxy compound formed by a reaction between the aromatic diol compound and the carbonic acid diester compound, and which has such a structure that the reaction mixture under a vacuum pressure of 40,000×10⁻⁶ MPa or less can be discharged and that the reaction mixture for lubricating contact portions among a gear, shaft and other gear pump members does not return into the pump and is discharged to the outside of the pump, wherein substantially no leakage means that the leakage of gas from the outside of the valve the gear pump, the flange or the flow passage is 120×10⁻⁶ MPa/h or less based on 1 liter of the inner capacity when the ultimate vacuum degree is 13.3×10⁻⁶ MPa.

14. The polycarbonate resin production process according to claim 13, wherein the gear pump comprises a scraping blade for preventing the reaction mixture from residing in a shaft end portion of the gear.

15. The polycarbonate resin production process according to claim 13 or 14, wherein a bushing for supporting the shaft of the gear is fixed to a cover plate and there is substantially no space between the cover plate and the bushing in the gear pump.

16. The polycarbonate resin production process according to any one of claims 13 to 15, wherein a flow passage at the reaction mixture inlet port of the gear pump has a restriction angle of 45° or less and has a smooth surface without level differences.

17. The polycarbonate resin production process according to any one of claims 13 to 16, wherein the liquid contact portion of the gear pump has a surface roughness of 10 μm or less.

18. The polycarbonate resin production process according to any one of claims 13 to 17, wherein a gland packing is used as a shaft seal material for the driving shaft of the gear pump.

19. The polycarbonate resin production process according to any one of claims 13 to 17, wherein a labyrinth seal is used as a shaft seal material for the driving shaft of the gear pump.

20. The polycarbonate resin production process according to any one of claims 13 to 19, wherein a hollow metal O ring is used to seal the fixed portion of the gear pump.

21. A process for producing a polycarbonate resin through the melt polycondensation of an aromatic diol compound and a carbonic acid diester compound, wherein (3) flanges having the following structure and characteristic properties are used in the production process:

(3) flange; flange which has a heat durability of 150° C. or more, substantially no leakage under a vacuum pressure of 40,000×10⁻⁶ MPa or less and a pressure durability of 0.1 MPa or more, whose liquid contact portion is made from a material having corrosion resistance against a monohydroxy compound formed by a reaction between the aromatic diol compound and the carbonic acid diester compound, and which has a heating medium jacket therein, wherein substantially no leakage means that the leakage of gas from the outside of the valve, the gear pump, the flange or the flow passage is $120 \times 10^{-6}$ MPa/h or less based on 1 liter of the inner capacity when the ultimate vacuum degree is $13.3 \times 10^{-6}$ MPa.

22. The polycarbonate resin production process according to claim 21, wherein the flange has a groove-shaped gasket seat.

23. The polycarbonate resin production process according to claim 21 or 22, wherein a gasket for connecting the flange has a metal O ring.

24. The polycarbonate resin production process according to any one of claims 21 to 23, wherein a spacer is sandwiched between the flanges.

25. The polycarbonate resin production process according to any one of claims 21 to 24, wherein the liquid contact portion of the flange has a surface roughness of 10 $\mu$m or less.

26. A process for producing a polycarbonate resin through the melt polycondensation of an aromatic diol compound and a carbonic acid diester compound, wherein (4) flow passages having the following structure and characteristic properties are used in the production process:

(4) flow passage; flow passage which has a heat durability of 150° C. or more, substantially no leakage under a vacuum pressure of $40,000 \times 10^{-6}$ MPa or less and a pressure durability of 0.1 MPa or more, whose liquid contact portion is made from a material having corrosion resistance against a monohydroxy compound formed by a reaction between the aromatic diol compound and the carbonic acid diester compound, which is restricted and/or expanded at a vertical angle of 20° or less, and whose surface is smooth without level differences, wherein substantially no leakage means that the leakage of gas from the outside of the valve, the gear pump, the flange or the flow passage is $120 \times 10^{-6}$ MPa/h or less based on 1 liter of the inner capacity when the ultimate vacuum degree is $13.3 \times 10^{-6}$ MPa.

27. The polycarbonate resin production process according to claim 26, wherein the restricted and/or expanded portion of the flow passage is a reducer.

28. The polycarbonate resin production process according to claim 26, wherein the flow passage is a pipe.

29. The polycarbonate resin production process according to claim 28, wherein the curvature of a curved portion of the pipe is 5 times or more the inner diameter of the pipe.

30. The polycarbonate resin production process according to claim 28, wherein the pipe is connected by a socket.

31. The polycarbonate resin production process according to claim 26, wherein the liquid contact portion of the flow passage has a surface roughness of 10 $\mu$m or less.

* * * * *